(12) United States Patent
Eriksson

(10) Patent No.: US 11,451,187 B2
(45) Date of Patent: Sep. 20, 2022

(54) SYSTEMS AND METHODS FOR SOLAR PANEL MOUNTING

(71) Applicant: Aaron Eriksson, Nolensville, TN (US)

(72) Inventor: Aaron Eriksson, Nolensville, TN (US)

( * ) Notice: Subject to any disclaimer, the term of this patent is extended or adjusted under 35 U.S.C. 154(b) by 0 days.

(21) Appl. No.: 17/077,786

(22) Filed: Oct. 22, 2020

(65) Prior Publication Data

US 2021/0041144 A1 Feb. 11, 2021

Related U.S. Application Data

(63) Continuation-in-part of application No. 16/331,124, filed on Mar. 6, 2019, now Pat. No. 11,139,773,
(Continued)

(51) Int. Cl.
*F24S 25/61* (2018.01)
*H02S 20/23* (2014.01)
(Continued)

(52) U.S. Cl.
CPC ............. *H02S 20/23* (2014.12); *F24S 25/37* (2018.05); *F24S 25/61* (2018.05); *F24S 25/613* (2018.05); *F24S 25/636* (2018.05); *F24S 25/65* (2018.05); *F24S 25/67* (2018.05); *F24S 2020/11* (2018.05); *F24S 2025/021* (2018.05); *F24S 2025/022* (2018.05); *F24S 2025/6005* (2018.05); *F24S 2025/804* (2018.05); *Y02B 10/20* (2013.01); *Y02E 10/47* (2013.01)

(58) Field of Classification Search
CPC . H02S 20/23; F24S 25/37; F24S 25/61; F24S 25/65; F24S 25/636; F24S 25/67; F24S 25/613; F24S 2020/11; F24S 2025/6005; F24S 2025/804; F24S 2025/021; F24S 2025/022; Y02B 10/20; Y02E 10/47
See application file for complete search history.

(56) References Cited

U.S. PATENT DOCUMENTS 4,212,291 A * 7/1980 Erb .................. F24S 10/73
126/669
6,065,256 A 5/2000 Joko
(Continued)

FOREIGN PATENT DOCUMENTS

EP 2725309 4/2014
WO 2019144154 7/2019

OTHER PUBLICATIONS

Erikkson; U.S. Appl. No. 16/331,124, filed Mar. 6, 2019.
(Continued)

*Primary Examiner* — Jessie T Fonseca
(74) *Attorney, Agent, or Firm* — Fitch, Even, Tabin & Flannery LLP

(57) ABSTRACT

Systems and methods for mounting solar panels include a curb assembly coupled to a top surface of a roof. An end of a solar panel rests on a portion of the assembly. An astragal is located with a portion of the astragal extending over the edge of the solar panel. A fastener is engaged through the astragal and the curb assembly such that a portion of the astragal contacts and compressively engages the top surface of the supported solar panel edge, whereby the solar panel is mounted to the roof.

14 Claims, 15 Drawing Sheets

Related U.S. Application Data which is a continuation of application No. PCT/US2019/014628, filed on Jan. 22, 2019.

(60) Provisional application No. 62/619,273, filed on Jan. 19, 2018.

(51) Int. Cl.
*F24S 25/37* (2018.01)
*F24S 25/636* (2018.01)
*F24S 25/65* (2018.01)
*F24S 25/67* (2018.01)
*F24S 25/613* (2018.01)
*F24S 25/00* (2018.01)
*F24S 25/60* (2018.01)
*F24S 20/00* (2018.01)

(56) References Cited

U.S. PATENT DOCUMENTS

| | | | |
|---|---|---|---|
| 6,182,403 B1 | 2/2001 | Mimura | |
| 9,431,953 B2* | 8/2016 | Stearns | F24S 25/636 |
| 9,745,754 B1* | 8/2017 | Narita | H02S 20/23 |
| 9,876,463 B2* | 1/2018 | Jasmin | F24S 25/65 |
| 11,139,773 B2 | 10/2021 | Eriksson | |
| 2011/0036028 A1* | 2/2011 | Beck | F24S 25/636 52/173.3 |
| 2011/0138710 A1 | 6/2011 | Reisdorf | |
| 2015/0288320 A1* | 10/2015 | Stearns | H02S 20/23 52/173.3 |
| 2016/0111996 A1* | 4/2016 | Stephan | F16B 5/0028 248/316.6 |
| 2016/0111997 A1* | 4/2016 | Ganshaw | F16M 13/02 248/224.7 |
| 2016/0268958 A1* | 9/2016 | Wildes | F24S 25/70 |
| 2017/0033730 A1 | 2/2017 | Almy | |
| 2018/0375461 A1* | 12/2018 | Stearns | F24S 25/40 |
| 2019/0013772 A1* | 1/2019 | Bamat | F16B 5/0028 |
| 2020/0389121 A1 | 12/2020 | Stephan | |
| 2021/0075363 A1 | 3/2021 | Eriksson | |

OTHER PUBLICATIONS

PCT; International Search Report for PCT/US2019/014628 dated Apr. 25, 2019.

USPTO; Non-Final Office Action issued in U.S. Appl. No. 16/331,124 dated Feb. 2, 2021.

USPTO; Notice of Allowance issued in U.S. Appl. No. 16/331,124 dated Jun. 8, 2021.

* cited by examiner

SYSTEMS AND METHODS FOR SOLAR PANEL MOUNTING

This application is a continuation-in-part of U.S. application Ser. No. 16/331,124, filed Mar. 6, 2019, which is a continuation of International Application No. PCT/US2019/014628, filed Jan. 22, 2019, which in turn claims the benefit of U.S. Provisional Application No. 62/619,273, filed Jan. 19, 2018, all of which are incorporated in their entirety herein by reference.

BACKGROUND OF THE INVENTION

1. Field of the Invention

The present invention relates generally to solar panels, solar heating, and other solar based systems for rooftop positioning on buildings. More particularly, it relates to a system for mounting solar panel arrays of photovoltaic or heating in solar heating arrays or the like on building rooftops which have a roof formed of engaged metal rooftop panels or homes having a wood roof or similar planar rooftop installations. The system provides cooperatively engageable metal roof panels for forming a rack system with a sealed roof of the building, which so engaged, concurrently provides a plurality of vertically projecting sections of adjacent panels. These projecting sections formed as part of each adjacent roof panel form above support members for supporting a solar panel for photovoltaic or water heating or another frame-engaged array, elevated above the formed roof and form a passage therebetween. An engageable astragal is positionable to secure the solar panels and seal the passage between projecting sections of adjacent roof panels.

2. Discussion of the Related Art

In recent years, it has become more popular in the United States and many foreign countries for building owners to install solar panels and solar heating and other solar-based devices on the rooftops of such building. Such installations of solar panel arrays generate electricity which can power the building itself or be communicated to the local grid. Many state and national governments offer tax incentives to building owners who make the financial commitment to install solar panels on such buildings.

Conventional metal roof systems, however, perform acceptable weatherproofing functions but such metal roof panels are currently configured for engagement to each other and underlaying support surfaces. However, they are not configured to incorporate solar panel attachment as part of the formed roof panels and roof structure.

Solar panel and solar heating attachment to roofs, via conventional racking, is not a designed or intended use of any other roofing system. While racked solar panel engagement to roofs is allowable, the piercing of the metal roof panels to mount the various components for holding solar panels in an array on the metal rooftop, is not desirable because the more screws and fasteners which pierce the seal of a roof panel, the more likely it is to leak over time. Further, solar system engagement mounting components and fasteners and the like are designed and sold separately from the roof panels, and the panels themselves have no structural accommodation to hold the solar panels or their mounting system.

As a consequence, solar racking systems continue to employ a conventional rail mounting system for the solar panel array, in both tilt leg and flush mount configurations. They do not, however, integrate the solar panels with the metal roof system itself and, thus, do not provide both roofing panels adapted for engagement to each other which also configure on the roof for a seamless engagement with the solar panel array.

Such a lack of integration between metal roofing panels and the solar array engaged with them has caused conventional solar panels to be mounted a distance above the underlying metal roof panels. Such causes problems such as an uplifting force from wind communicating between the solar panels and the metal roof panels which can cause significant damage. Further, conventional systems having a gap up to five inches or more between the solar panels, and roof panels allow birds and small animals to climb into the gap where they nest. This animal occupancy can wreak havoc with the mechanics of tilting solar panels along with leaves and debris which can enter the gap.

Using the solar racking system as a functional roof also allows for future expansion of the solar panel collection area or additional insulation across the entire roof. It reduces barriers to entry by lowering initial cost and allowing the owner to add and remove panels as needed to accommodate changing usage requirements, take advantage of new technology, requirements, or market conditions as needed.

The forgoing examples of related art as to solar panel and solar heating systems and their engagement to metal rooftops, and limitations related therewith, are intended to be illustrative and not exclusive, and they do not imply any limitations on the invention described and claimed herein. Various limitations of the related art will become apparent to those skilled in the art upon a reading and understanding of the specification below and the accompanying drawings.

SUMMARY OF THE INVENTION

The device herein disclosed and described provides a solution to the shortcomings in prior art with regard to engaging solar panels, solar heating components, and other solar arrays to the rooftops of buildings having metal roofs. While, for convenience, the language herein is directed primarily to photovoltaic solar panels, the mounting system herein is also configurable to hold solar heating panels, and other solar-energized components on a rooftop of a metal building. As such, when the term solar panel is employed herein, any boxed or paneled component which is rooftop-mounted on a metal building is to be considered included.

The integrated metal roof and solar mounting system herein, is configured to allow conventional solar photovoltaic arrays to be installed with a metal roofing system using the same construction means and methods that are conventionally already widely used in the roofing industry. Thus, no exceptional training or tools are required for the installation of the metal roof panels herein, to the underlying structure.

One core element to the system herein is the provision of metal roofing sections, which are adapted for attachment to the underlying support surface for the roof in a conventional screw type engagement. However, rather than conventional planar opposing side edges for each metal roof panel, the opposing side edges of the metal roof panels of the system herein include the addition of vertically projecting portions running along opposing side edges. Each such metal roof panel is a unitary planar structure which on opposing sides has a bend which forms projecting side portions. One side portion extends substantially normal to the planar portion in between. The opposing side portion is adapted to slidably engage with that of an adjacent metal roof panel to allow for adjustment. By planar is meant substantially flat, although, corrugations or channels are formed in a conventional fashion which run parallel to the opposing sides of the metal roof panel and, thus, substantially parallel to the projecting portions on both sides.

Also provided is an astragal which is employable to compress and secure a solar panel to the roof formed by the metal panels. This astragal additionally forms a seal over adjacent roof panels in another particularly preferred component of the device and method herein. The formation of the metal roof panels with opposing projecting and slidably engaged side edges, and the inclusion of the astragal herein which is configured to hold the solar panels and concurrently seal the two adjacent roof panels and their respective projecting edges, effectively merges two historically different scopes of work into one, and roofing and solar panels become a solar roof system.

The roofing system herein increases the performance of the solar collection of the array, and with the system herein, the solar materials provide additional insulation factors that improve the heat loss/gain profile of the roof. This is accomplished with the system herein by its configuration which traps a layer of air between the solar panels and metal roof panels which also provide shade to the roof surface formed of the engaged metal panels herein.

Still further the system herein provides channels and gaps which protect the electrical conductors of the solar panels in the formed array. Additionally, for aesthetic reasons the system herein allows for insulation blanks to be positioned where needed to improve the seamless aesthetic of the installation of the solar array of panels along valleys and gables. Still further, by combining the solar panels and roof and underlying structure into a single function, the value of the tax credit to the building owner can increase substantially.

With respect to the above description, before explaining at least one preferred embodiment of the herein disclosed metal roofing system with integrated solar panel engagement and the method therefor, it is to be understood that the disclosed system herein is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other roof and solar panel structures, methods and systems for carrying out the several purposes of the present invention. It is important, therefore, that the claims be regarded as including such equivalent construction and methodology insofar as they do not depart from the spirit and scope of the present invention.

The objects features, and advantages of the present invention, as well as the advantages thereof over existing prior art, which will become apparent from the description to follow, are accomplished by the improvements described in this specification and hereinafter described in the following detailed description which fully discloses the invention, but should not be considered as placing limitations thereon.

BRIEF DESCRIPTION OF THE DRAWINGS

The above and other aspects, features and advantages of several embodiments of the present invention will be more apparent from the following more particular description thereof, presented in conjunction with the following drawings.

The accompanying drawings, which are incorporated herein and form a part of the specification, illustrate some, but not the only or exclusive, examples of embodiments and/or features of the invention. It is intended that the embodiments and figures disclosed herein are to be considered illustrative rather than limiting. In the drawings.

Figure 1:
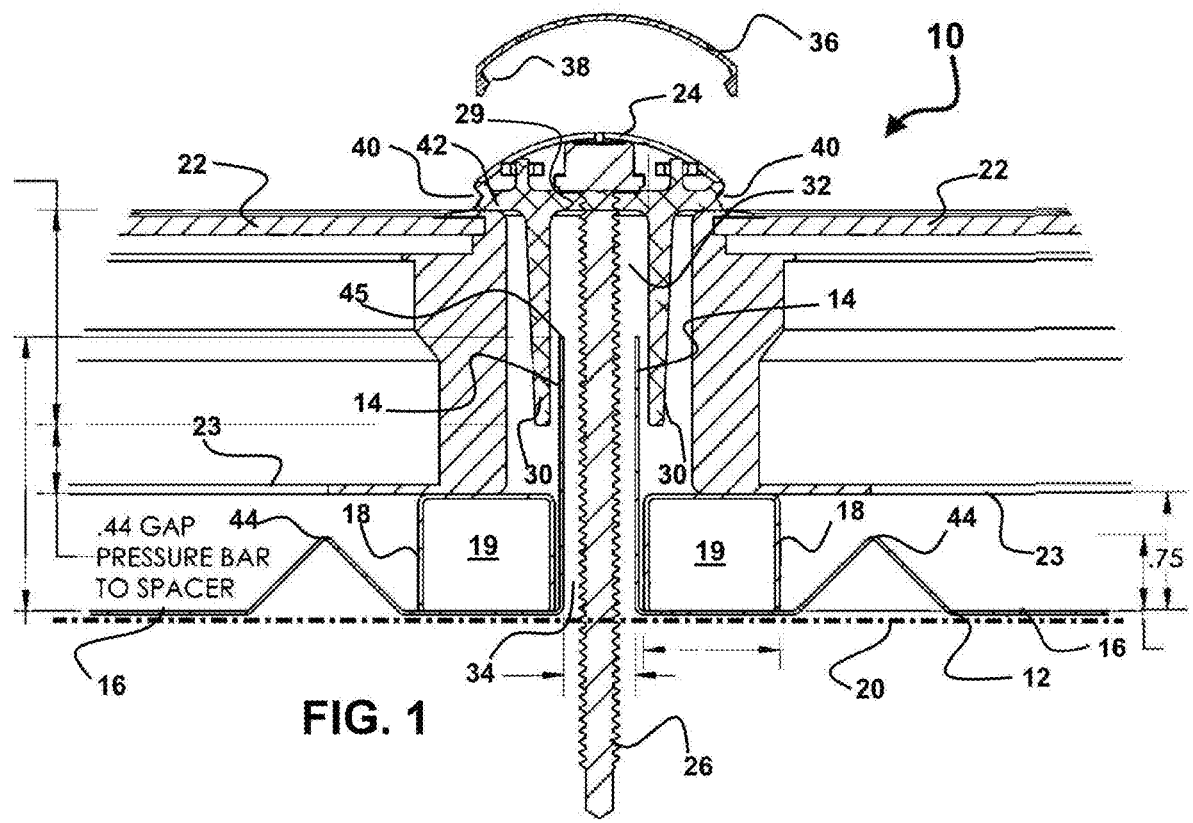
FIG. 1 shows a sectional view of the system herein showing the metal roof panels formed with side edges which project substantially normal to the metal panel therebetween, and showing the astragal and engageable cap which hold the solar panels and form a seal between adjacent metal roof panels.

Other aspects of the present invention will be more readily understood when considered in conjunction with the accompanying drawings, and the following detailed description, neither of which should be considered limiting.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

In this description, the directional prepositions of up, upwardly, down, downwardly, front, back, top, upper, bottom, lower, left, right and other such terms refer to the nose engagement device as it is oriented and appears in the drawings and are used for convenience only; they are not intended to be limiting or to imply that the device has to be used or positioned in any particular orientation.

Now referring to drawings in FIGS. 1-11, wherein similar components are identified with like numerals, FIG. 1 shows a depiction of a sectional view of the engaged components of the device 10 herein, enabling the method herein of FIGS. 7-11 where a rack system is formed for positioning of solar panels thereon above a metal or wood or other roof structure.

Figure 9:
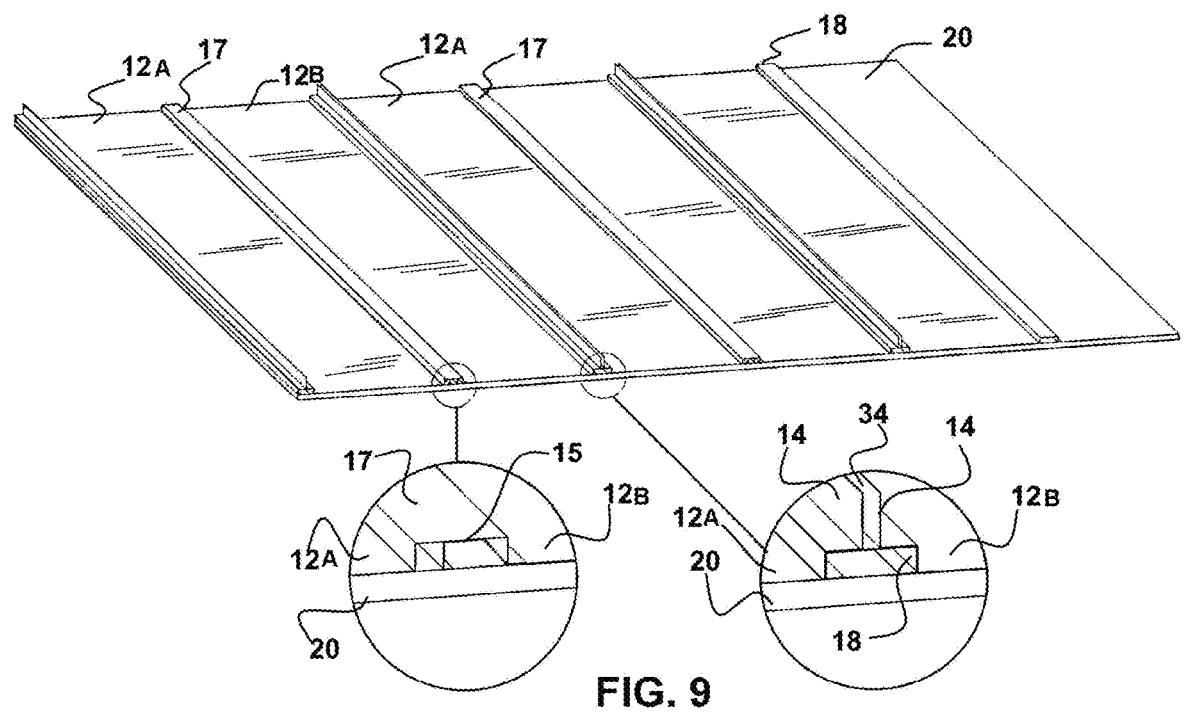

In FIG. 1 is shown the novel metal roof panels 12 each of which is formed with side edges having formed projecting portions 14. In some cases there may be only one projecting portion 14 along one edge of a roof portion of the roof panel 12, such as shown in FIG. 9 in the enlarged sections. In this mode, a first roof portion 12A engages a second roof portion 12B along a folded edge 15 located on the opposite side of each from the projecting portion 14 thereof. Thus, the roof panel 12 is formed by the first roof portion 12A engaged to the second roof portion 12B along the folded edge 15 of each to form the full roof panel 12.

In some installations the roof panels will be formed in a unitary structure with projecting portions 14 running along both side edges. In other roof panels 12 where more adjustment for positioning is desired, the folded edges 15 on the opposite sides of roof portions 12A and 12B from the projecting portion 14, allow for a sliding engagement to adjacent roof portions to form the roof panels 12 and to adjust the roof panels 12 slightly side to side during installation. This allows for a slight adjustment of the size of the formed openings 41 for the solar panels 22 between the projecting portions 14 on opposite sides of the formed roof panel 12. This sliding engagement of folded edges 15 of two roof portions 12A and 12B (FIG. 9) also forms a secondary supporting member 17 (FIGS. 9-11) for holding center portions of the solar panels 22 elevated which is particularly preferred.

The projecting portions 14, along one side edge of the roof panels 12, are formed by a bend in the metal material along the side edge. Each projecting portion 14 extends from the side edge on which it is positioned, at an angle substantially normal to the planar mid-section 16 of the metal roof panels 12. By substantially normal is meant plus or minus 10 degrees from perpendicular.

As shown in FIG. 1, each roof panel 12, whether formed of two engaged roof portions or a roof panel 12 in one section, sits atop an underlying support structure 20 shown in dotted line.

Screws 26 engaged to the underlying support structure impart force against the support members 18 to hold them and to hold the metal roof panels 12 sandwiched under them, in position. Such underlying support structures for example include a metal roof of an existing building or a wood or shingled roof. Also shown are the support members 18, which abut and overlay the projecting portions 14 of the adjacent roof panels 12, which are positioned thereon and can support the solar panel 22, thereon. The support members 18 may be formed in two sections as in FIG. 1, or in a single section shown in FIG. 1A or 1B which is preferred, since it positions a seal formed by the bent portions of the roof panel 12 over the top of the support member 18 leading to the projecting portion 14. This positions the roof panel 12 in the mode of FIGS. 1A and 1B, above any communication of the screw 26 through the underlying roof structure.

An astragal 24, shown in FIG. 1, is placed in operative compressive engagement with adjacent solar panels 22 which is particularly preferred in all modes of the system 10 herein. A screw 26 is engaged through a central portion 29 thereof during installation, to hold the astragal 24 to the underlying support surface 20. This screw 26 can be adjusted to impart a measured compression to the astragal 24, which in turn will contact and engage the edges of the solar panels 22 or frames surrounding them in a compressive sealed contact therewith. This compressive engagement will also impart force to the bottom side of the solar panel 22 against the support members 18 and will compressively engage projecting contact points 28 (FIG. 2) on opposing sides of the astragal 24 against the perimeter edge of the solar panel 22 to compressibly engage it and hold it in place.

Depicted in FIG. 1, also, are parallel ribs 30 having a gap 32 therebetween. This gap 32 is aligned with an opening 34 positioned between the two projecting portions 14 which are on one respective side of each of the two roof panels 12. With the screw 26 operatively engaged with the underlying surface 20, and the astragal 24 compressibly engaged against the adjacent solar panels 22, the gap 32 and opening 34 between projecting portions 14, align to provide the path for the screw 26 to be engaged with the underlying support surface 20.

Figure 1A:
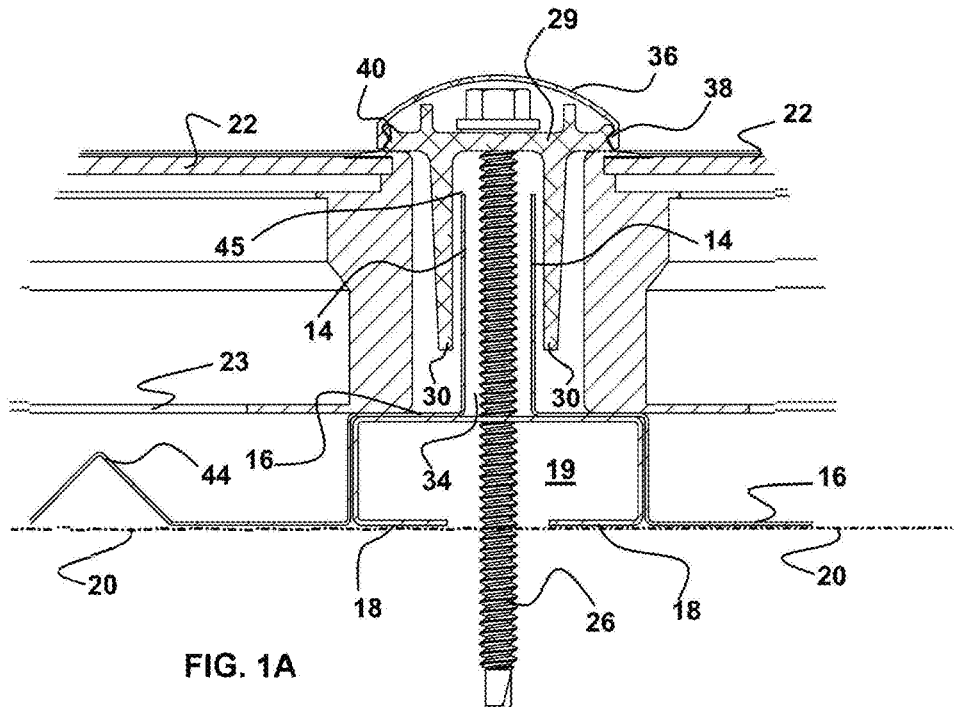
FIG. 1A is a sectional view of another mode of the system herein similar to that of FIG. 1, except that it employs a single support member which is positioned underneath the roofing panels rather than on top as in FIG. 1.

Additionally, the two ribs 30 are formed of a length projecting from the center portion 29, to extend past the distal ends 15 of the projecting portions 14 when the screw 26 is tightened to compress the astragal 24 against the solar panels as in FIGS. 1 and 1A. This forms a moisture seal to prevent fluid which might get past the compressive engagement and seal of the astragal 24 against the adjacent solar panels 22 and prevent such from getting into the opening 34 between adjacent roof panels 12.

Figure 1B:
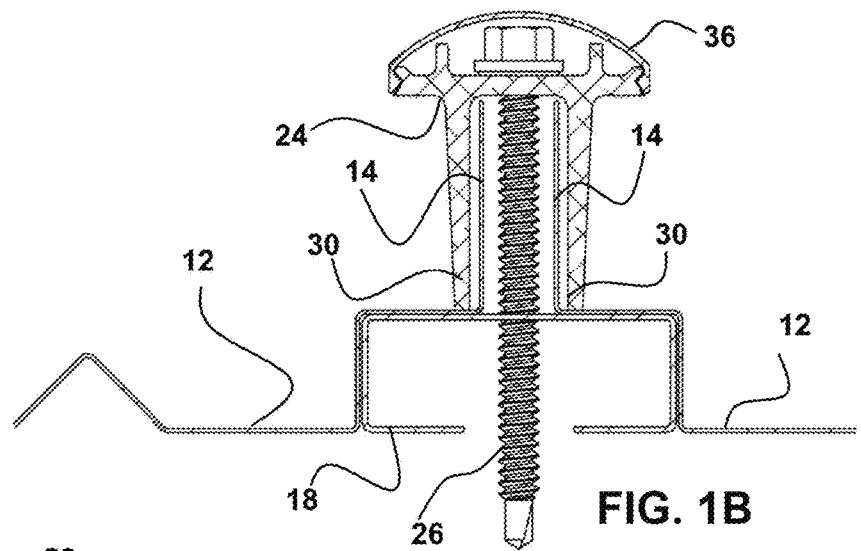
FIG. 1B shows the astragal engaged to an underlying support member and holding adjacent panels in a compressed sandwiched engagement, without a solar panel engaged which can be added at a subsequent time by loosening the screw and inserting solar panels under the opposing edges of the astragal.

Also shown in FIGS. 1, 1A, and 1B, is an engageable cap 36 which has side edges 38 which are configured to engage into recesses 40 in the opposing sides of the astragal 24. The cap 36 is formed of a flexible or elastic material which allows the side edges 38 to temporarily when the cap 36 is pushed against the surfaces of the astragal 24 above the recesses 40 and deflect and then compress into the recesses 40. Once the edges 38 engage into the recesses 40 they form a water tight seal over the top and sides of the astragal 24.

While not shown in detail in FIG. 1, the interior cavities 19 of the support members 18 or more preferable, the area within the opening 34 between the projecting portions 14, both define passages which may be employed for positioning of wiring for both the solar panels 22 and any controllers or the like. The opening 34 works especially well since prior to positioning of the astragal 24 thereover, the wires are easily tucked into the opening 34 and then covered with the astragal 24.

Shown in FIG. 1B, is a unique functional aspect of the system 10 herein, where the solar panels 22 have not yet been installed or have been removed. This is particularly preferred because there are instances where solar panel installation is delayed, or where they must be removed and replaced. Using the system 10 herein, the support members 18 can be installed onto the underlying support structure, and the roof panels 12 can be operatively positioned with the projecting portions 14 extending thereabove. The astragal 24 can then be engaged to form a seal with the ribs 30 contacting the support member 18 by tightening the screw 26. Once the solar panels become available, or are repaired and ready for replacement, the screw 26 may be loosened temporarily, and the solar panels 22 can be installed as in FIG. 1A. The utility provided by the system 10 as shown in FIG. 1A is particularly important because there are times when solar panels are damaged and must be removed and replaced, or when the panels arrive too late for a winter installation. The ability to form the mounting system 10 herein which forms the racks for easy installation, and or removal and reinstallation of subsequently installed solar panels 22 gives the contractor an advantage.

Figure 2:
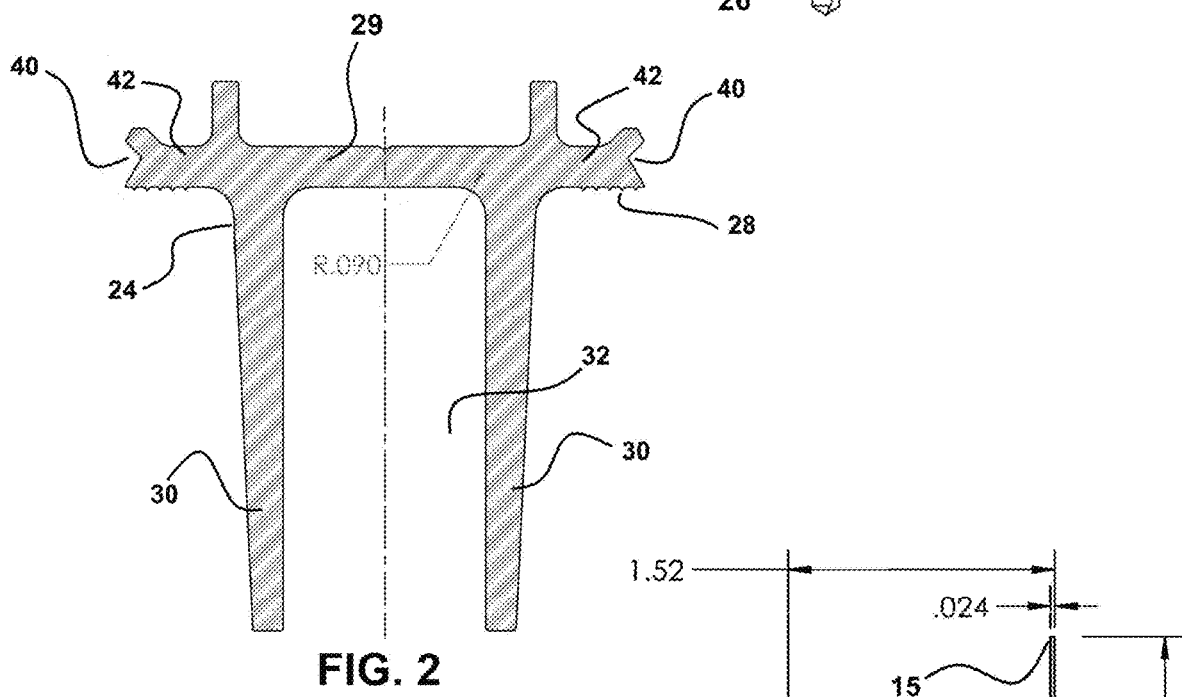
FIG. 2 shows a side view of the astragal herein employed as in FIG. 1.

Shown in FIG. 2 is an end view of the typical astragal 24 herein employed as in FIG. 1. The projecting contact points 28 can be seen on the lower edges of opposing projecting ledges 42 projecting in opposite directions on opposing sides of the body forming the astragal 24. These points 28 have been found to better engage with the surface of the solar panels 22 and form a secure contact and seal therewith. Also shown are the ribs 30 projecting from the center portion 29 a distance for surrounding the opening 34 between the two projecting portions 14. Also depicted are the two recesses 40 formed into the edges of the ledges 42 which engage to the side edges 38 formed on the flexible cap 36.

Figure 3:
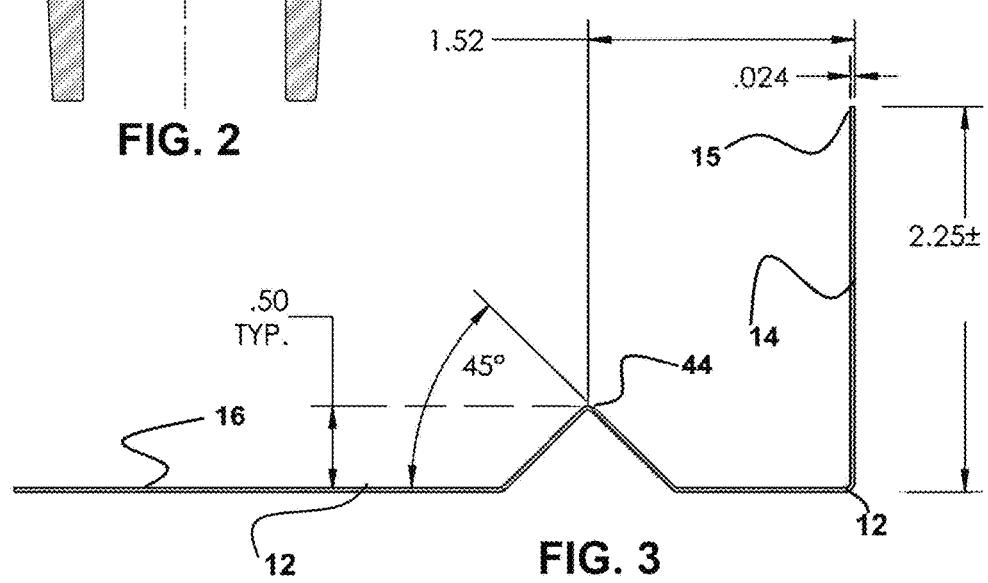
FIG. 3 shows the metal roofing panel herein provided having projecting portions formed along opposing side edges of the metal panel.
Figure 10:
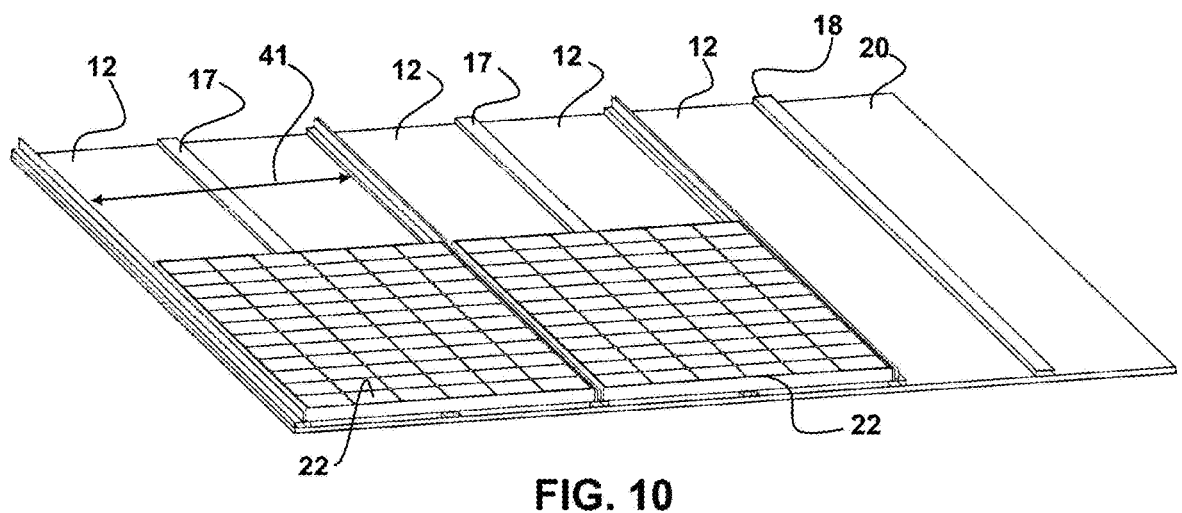
Figure 11:
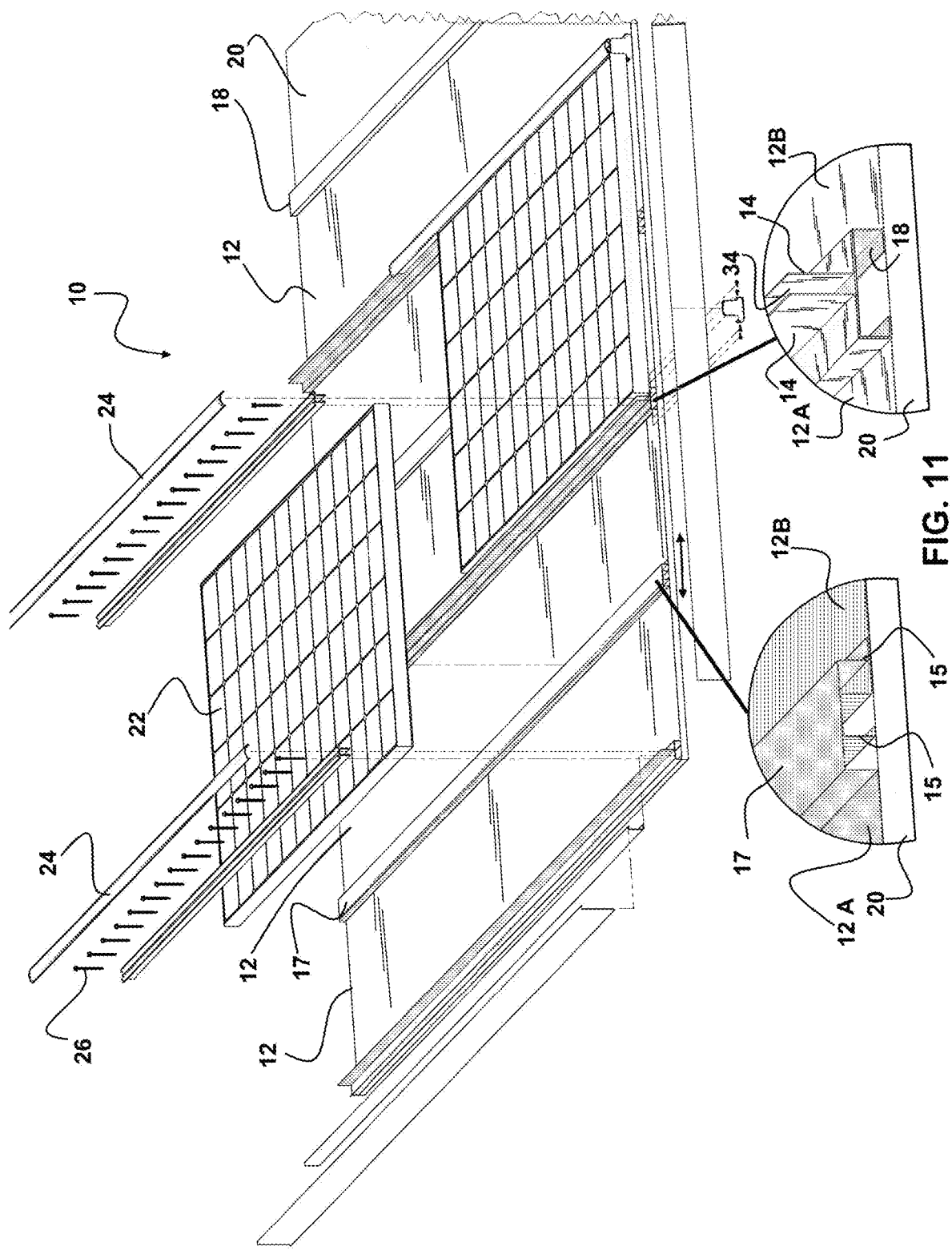

In FIG. 3 is shown one side edge of the metal roofing panel 12 per the device 10 and method herein. As depicted, the projecting portions 14 can extend from one or both side edges of the roof panel 12. As noted, the projecting portions 14 run substantially normal to the planar mid section 16 of the panel 12. As also noted, in a particularly preferred mode of the system 10 which uses two roof portions 12A and 12B (FIG. 9) engaged at folded edges 15 which forms the secondary support members 17, the opposite side edges of the formed roof panels 12 from the projecting portion 14 of each, can be configured with the folded edge 15 as in FIGS. 9 and 11. When engaged over each other, the folded edges 15 form the secondary support member 17 shown in FIGS. 9-11.

Where both side edges of the roof panels 12 have the projecting portion 14 and the roof panel is formed in a single sheet, support members 18 may be positioned on the underlying structure instead of forming the secondary support members 17. However, by forming the roof panels 12 in a first and second portion 12A and 12B as noted herein, each having folded edges 15 such that they will engaged and form the secondary support members 17, additional support is provided to the solar panels 22. This additional support is provided without the need or expense for extra support members 18 such as shown in FIGS. 9-11. Optionally the folded edges 15 can be formed to slide slightly upon each other, to allow for a side to side adjustment of the first and second portions 12A and 12B of roof panel 12, (FIG. 9) to provide additional function in that the size of the openings 41 (FIG. 10) can be adjusted if needed.

Figure 4:
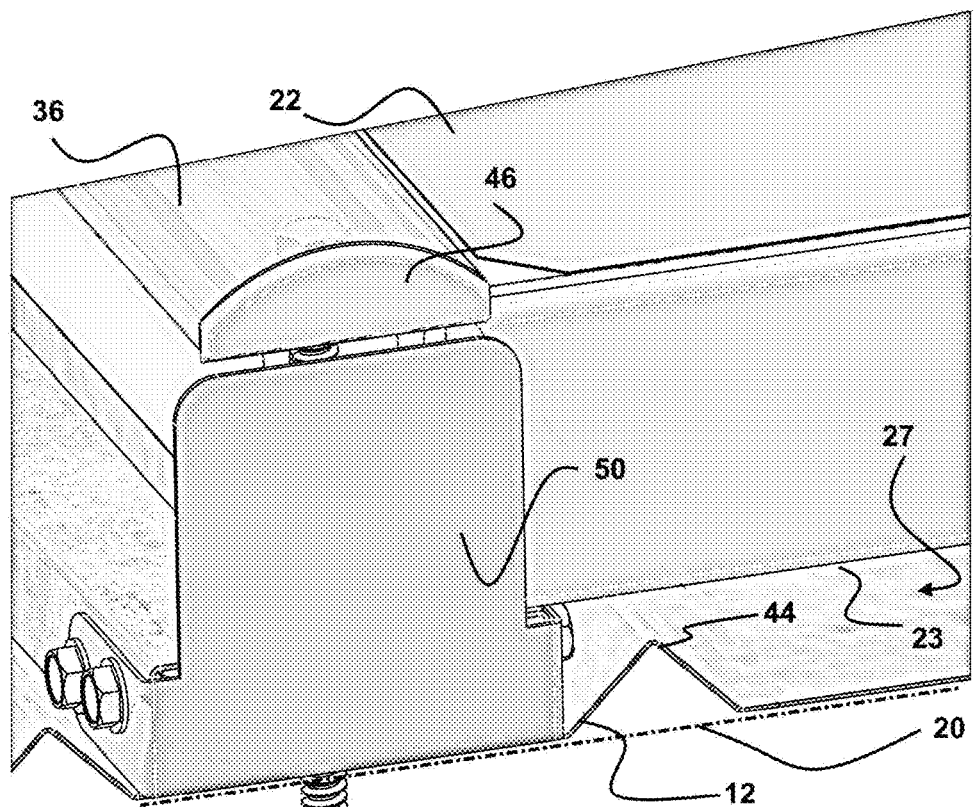
FIG. 4 shows the system herein in a perspective end view showing a cap engaged along the astragal which holds the solar panels atop the underlying support members and showing the very small gap between the back of the solar panel and planar portions of the roof.
Figure 5:
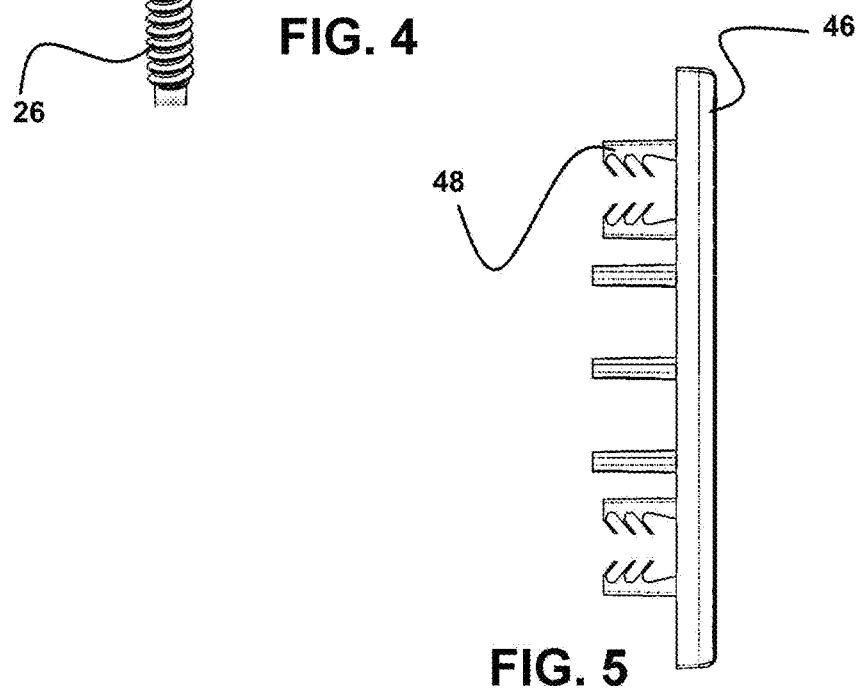
FIG. 5 shows an end view of an end cap engageable with the astragal as in FIG. 4.

FIG. 4 depicts the device herein in a perspective end view of the device 10 in an assembled mode, showing the cap 36 engaged along the astragal 24. The astragal 24 is engaged by the screw 26 to the underlying support structure 20 and compressibly engages the ledges 42 against the solar panel 22 edge. An end cap 46 is shown engaged to the upper side edge of the astragal 24 using projecting prongs 48 (FIG. 5). An end cap 50 is also shown covering the open ends of the support members 18 and the gap 32 and covers the opening 34 shown in FIG. 1.

As can be seen in FIG. 1 and FIG. 4, using the system herein, a very small gap 27 is formed between the rear surface 23 of the solar panel 22 and the upper surface of the roof panel 12. Such is preferably between ½ to ¾ of an inch and can be smaller if the peak of the formed ridges 44 are less than ½ inch above the surface of the mid section 16 of the roof panel 12. Such prevents lift from wind and the intrusion of animals and birds underneath the solar panels 22 and a secondary cover not shown can be provided to cover this gap 27. The gap 27 provides a passage for venting heat from the solar panels 22.

The end cap 46 can be formed to fit inside the cap 36 on top of the solar modules. This requires that the astragal 24 to shortened slightly shorter than the solar modules to provide space for the end cap 46. The end cap 46 in all modes is preferably formed of a compliant material (for example rubber or foam) and it could also serve as an expansion joint between sections of the astragal 24 to prevent thermal expansion stresses while concurrently eliminating any gaps.

FIG. 5 shows an end view of the end cap 46 engageable with the top portion of the astragal 24 as in FIG. 4. The prongs 48 are configured to removably engage in recesses 40 formed in the astragal 24 as can be seen in FIG. 1.

Figure 6:
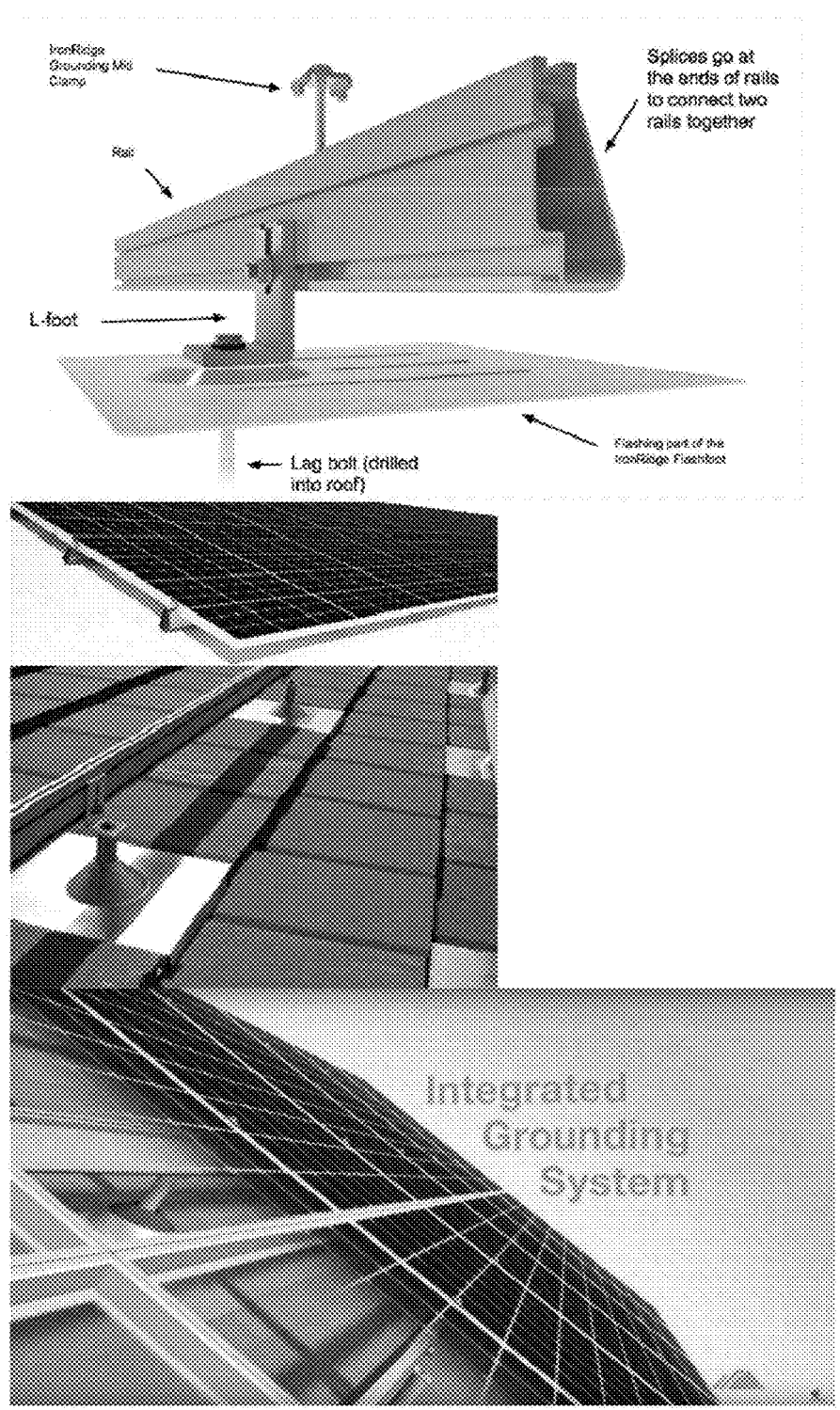
FIG. 6 depicts a conventional solar panel installation wherein the metal roof panels are not integral to the installation and instead the solar panels are supported on a frame supported by posts with a large gap between the frame and roof surface.

FIG. 6 is for reference and depicts a typical prior art view of the mounting of conventional solar panel systems on rooftops, which those skilled in the art will be familiar with. As can be seen, the roof panels conventionally are separate from and form no part of the engagement system, which is mounted on purlins and rafters elevated above the roof. In conventional systems, many more holes are drilled through the support structure such as a roof and they are not covered by any sealing system such as herein.

FIGS. 7-11 show components of the system 10 herein being installed onto an existing roof of a metal or wood roof of a building to form a rack system adapted for the easy and secure positioning of solar panels thereon. As shown in FIGS. 7-11 the roof panels 12 can be formed of a first section 12A and second section 12B, which engage at respective folded edges 15 opposite respective projecting portions 14 thereon.

Figure 7:
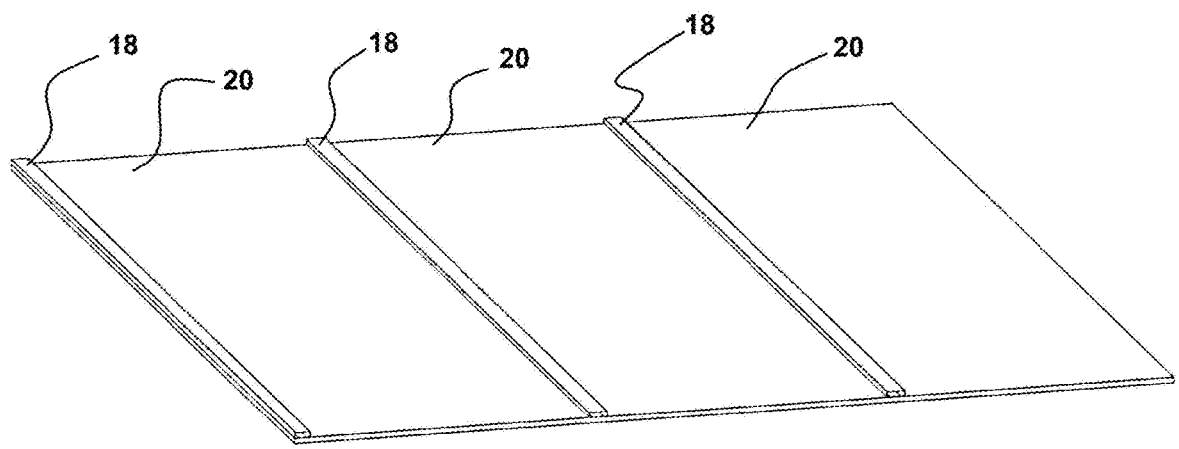
FIGS. 7-11 show components of the system herein being installed onto an existing roof of a metal or wood roof of a building to form a rack system adapted for the easy and secure positioning of solar panels thereon.

In the system 10 herein, in a first step, shown in FIG. 7, support members 18 are positioned on the support structure 20 such as an underlying roof surface of a building. Where the roof panels 12 have projecting portions 14 on both opposing side edges, extra support members 18 may be installed to provide center support to overlying solar panels 22 if needed.

Where the roof panels 12 are formed in sections 12A and 12B, with a first side edge having the projecting portion 14 and the opposing second side edge having a folded edge 15 configured to engage over and with a similar folding edge 15 of an adjacent roof panel 12, the engagement forms the secondary support member 17. This secondary support member provides support to the solar panels 22 and maintains the gap 32 between them and the underlying support structure 20.

This mode of the system 10 herein is preferable since it allows for smaller sections 12A and 12B to form the roof panels 12 which are easier to handle in wind and weather. It is additionally preferred since it forms an overlapping seal of the folded edges 15 as well as a strong secondary support member 17 to help support the solar panels 22 better.

Figure 8:
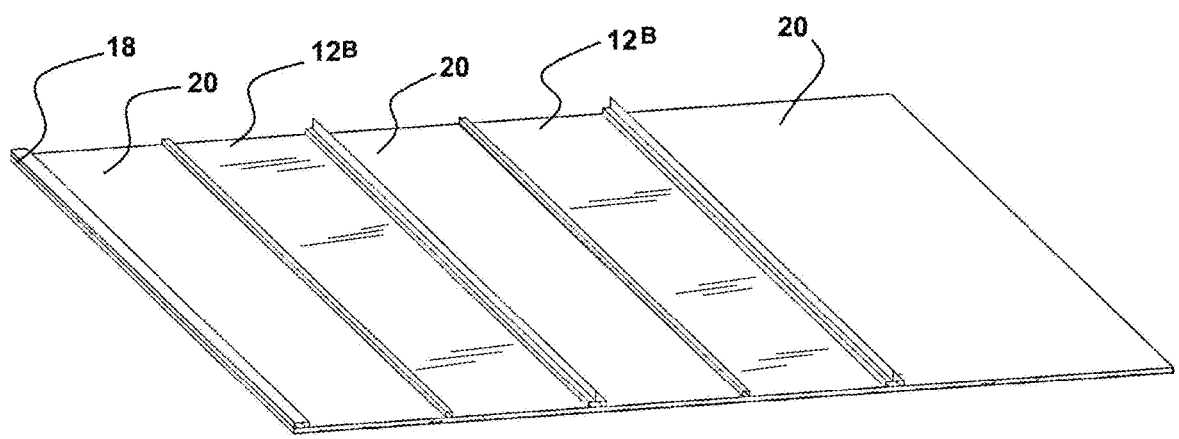

In FIG. 8 is shown the positioning of portions of the roof panels 12 to be formed in the manner shown in FIG. 9, upon the support members 18 shown installed in FIG. 7. Each roof panel portion 12B has a first side edge with the projecting portion 14 and an opposing second side edge with a folded edge 15 such as shown in FIGS. 9 and 11 where the folded edges 15 overlap.

This is followed by the positioning of the rest of the roof panel portions 12A shown in FIG. 9, wherein each of the support members 18 have a pair of parallel projecting portions 14 of adjacent roof panels 12 thereabove, and each of the folded edges 15 on the second side edges of the roof panels 12 are overlapped to form the secondary support members 17.

Thereafter as shown in FIG. 10, the solar panels 22 are placed within openings 41 formed between the support members 18 which have the two projecting portions 14 of roof panels 12 extending thereabove. Central areas of the openings 41 have the formed secondary support members 17 therein to support the underside of the solar panels 22. The width of the formed openings 41 between the projecting portions 14 on opposing sides of each formed roof panel 12 is adapted for positioning the solar panels 22 therein. Whether the roof panels 12 are formed in a single unit with projecting portions 14 on both opposing sides as in FIG. 1, or as two roof panel portions having engaged folded edges 15 as in FIGS. 7-11, the width of the openings 41 is configured to position sides of the solar panels 22 over the support members 18 and adjacent the projecting portions 14 so they are engaged by the contact points 28 of the ledges 42 extending from the center portion 29 of the astragal 24 when the screw 26 is tightened.

Finally, FIG. 11 shows the system 10 herein, formed from the roof panels 12 of FIGS. 7-10 where second sides of the roof panels 12 overlap and form the secondary support members 17.

However, if roof panels 12 having projecting portions 14 formed on both opposing side edges are employed, the assembly of the system 10 shown in FIG. 11 is substantially the same but for the positioning of additional support members 18 where the secondary support members 17 are formed by roof panels 12 with the folded edges 15 on second sides.

Figure 12:
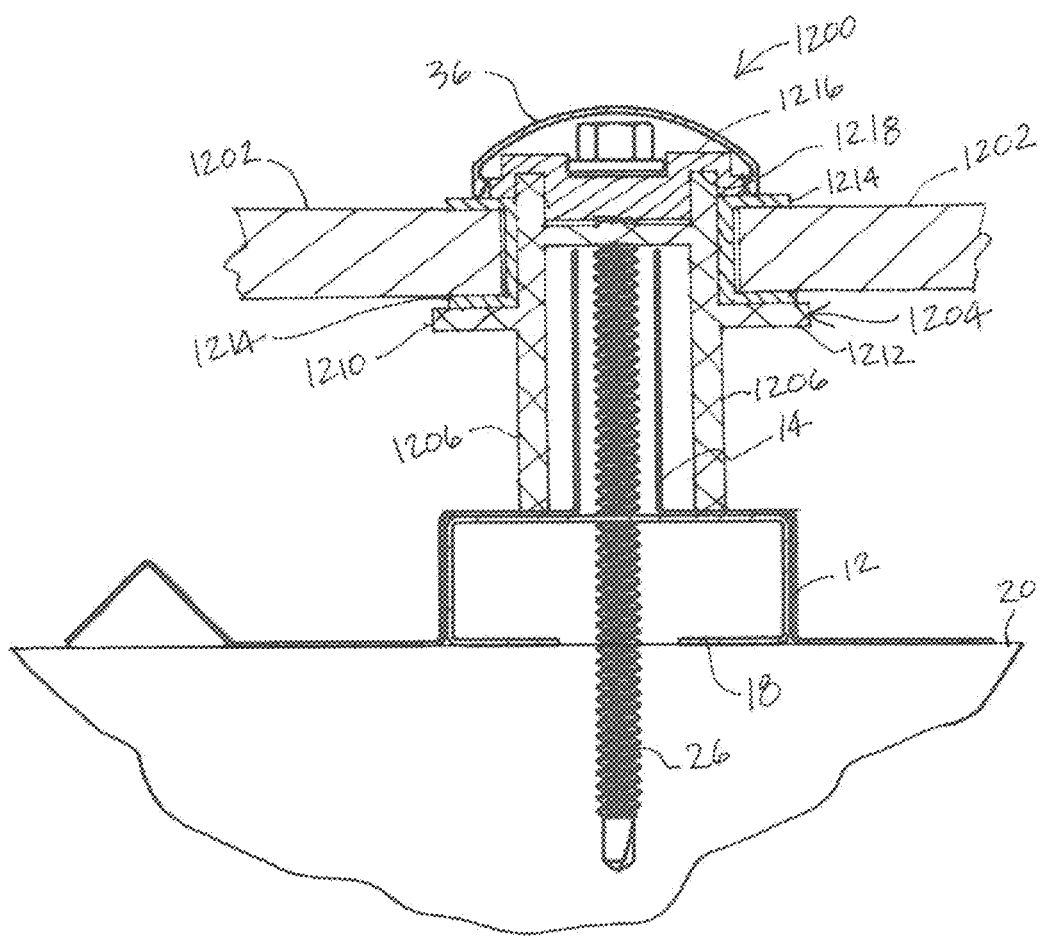
FIG. 12 is a sectional view of a system to support and seal between frameless solar panels in another embodiment of the present invention.

Referring next to FIG. 12, a sectional view of a system 1200 to support and seal between frameless solar panels is shown in another embodiment of the present invention. Shown are engageable cap 36, screw 26, support member 18, projecting portions 14, roof panels 12, underlying support structure 20, frameless solar panels 1202, a frameless astragal 1204, parallel ribs 1206, center portion 1208, left shelf 1210, right shelf 1212, rubber gasket 1214, pressure bar 1216, and notches 1218.

System 1200 is configured to support frameless solar panels. As shown frameless solar panels 1202 are thinner than the framed solar panels 22. The height of the panels above the roof is affected by the amount of space required underneath the solar panels 1202 for microinverters, optimizers, wiring, and/or other elements located between the solar panels 1202 and the roofing.

The frameless astragal 1204 includes two vertical, substantially parallel ribs 1206 that bear on and are supported by the support member 18. By substantially is meant a maximum angular difference of less than 10 degrees. A center, substantially horizontal portion 1208 is interposed between the two ribs to form an H-shape. A left shelf 1210 extends horizontally outward from the left side of the astragal 1204, and a right shelf 1212 extends horizontally outward from the right side of the astragal 1204. The left shelf 1210 and the right shelf 1212 are located at the same height. An edge of each solar panel 1202 bears on and is supported by the proximate shelf 1210, 1212. Each shelf 1210, 1212 and rib 1206 has a width and thickness suitable for required strength and serviceability requirements for structural support of the frameless solar panel 1202. In some embodiments the rubber gasket 1214 is interposed between the frameless solar panels 1202 and the frameless astragal 1204. The rubber gasket 1314 protects the unprotected glass edge of the solar panels 1202 from breakage.

The continuous pressure bar 1216 is seated on top of the frameless astragal 1204. The pressure bar 1216 includes two downward-facing notches 1218 configured to receive the upper ends of the parallel ribs 1206. The pressure bar 1216 extends outward on each side, generally parallel to the proximate shelf 1210, 1212, to cover a portion of the proximate frameless solar panel 1202 end. Each side end of the pressure bar 1216 includes the recess for receiving the engageable cap 36. In some embodiments the pressure bar 1216 is aluminum, but may be of any suitable material. The pressure bar 1216 received the solar panels 1202 and secures them to the frameless astragal 1204 and the support member 18. The pressure bar 1216 also provides an anchor point for the engageable weather cap 36. The generally vertical screw 26 is engaged through a central portion of the pressure bar 1216 and the central portion 1208 of the frameless astragal 1204 and is secured into the support member 18 below. Screw 26 as shown in the illustration secures the entire assembly to the underlying roof deck, as well as securing the pressure bar 1216 to the underlying strut 1204 however additional shorter fasteners such as self-tapping screws could be used to secure the pressure bar 1216 to the underlying frameless astragal 1204 as needed to pinch the frameless glass edge of the solar panel 1202 between the frameless astragal 1204 and the pressure bar 1216 to make sure that the solar panel 1202 is firmly secured.

The screw 26 can be adjusted to both secure the frameless astragal 1204 to the support member 18 and to provide compress the pressure bar 1216 to the top of the frameless solar panel 1202. The screw couples the pressure bar to the frameless astragal, whereby the frameless solar panel is constrained against vertical movement by being interposed between the frameless astragal shelf and the corresponding side portion of the pressure bar. As the bottom edge of the solar panel 1202 is supported by the corresponding shelf 1210, 1212, the downward pressure applied to the frameless solar panel by the screw 26 adjustment will provide additional restraint to the connection by engaging the edges of the solar panels 1202 or frames surrounding them in a compressive sealed contact between the frameless astragal 1204 and the pressure bar 1208. In this way the frameless solar panels 1202 are compressibly engaged and held in place.

As described with respect to previous embodiments the system 1200 similarly allows the support members 18 to be installed onto the underlying support structure, and the roof panels 12 can be operatively positioned with the projecting portions 14 extending thereabove before installation of the frameless astragal 1204. The frameless astragal 1204 is then later installed. When solar panels 1202 are repaired or replaced the screw 26 may be loosened temporarily, and the solar panels 22 can be reinstalled.

In other embodiments the frameless astragal 1204 or the astragal 24 can be combined with various embodiments of solar panels and/or roof panels to result in a system that is more suitable for the structural characteristics of the glass-based solar panels and is more efficient in the use of materials. For example, the roof panel system may be narrower and include simpler astragal and roofing profiles. The revised roof panel system may be used in conjunction with frameless or mini-frame solar panels.

Figure 13:
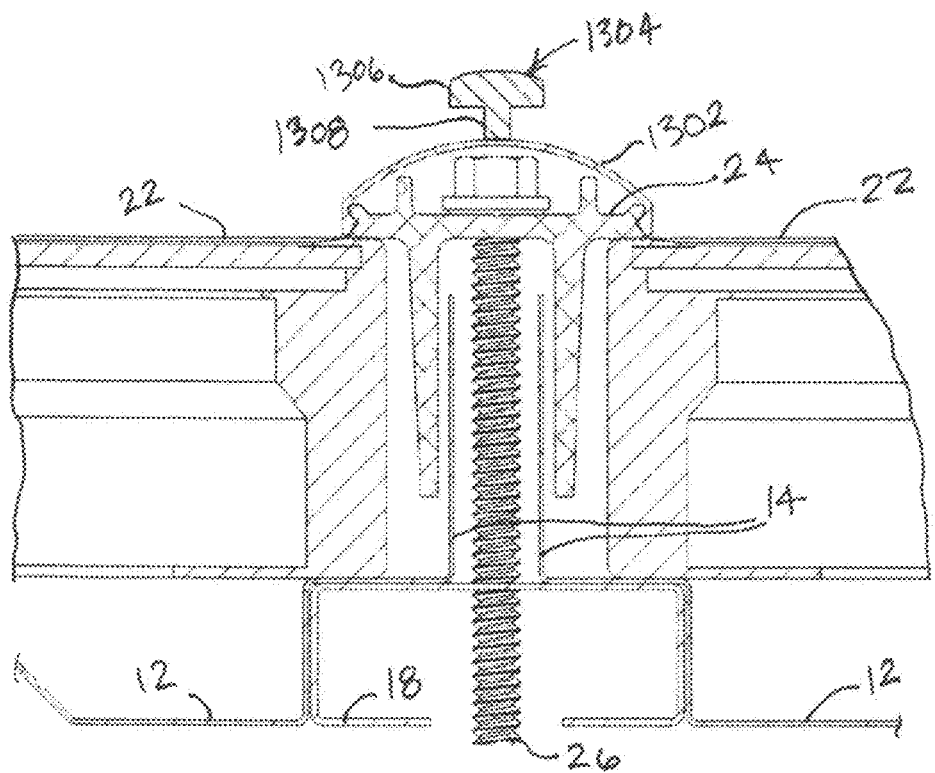
FIG. 13 is a sectional view of a system to support and seal between solar panels, including a rail extension, in another embodiment of the present invention.

Referring next to FIG. 13, a sectional view of a system 1300 to support and seal between solar panels including a rail extension is shown in another embodiment of the present invention. Shown are screw 26, support member 18, projecting portions 14, roof panels 12, solar panels 22, astragal 24, engageable cap 1302, rail extension 1304, head 1306, and web 1308.

The embodiment shown in FIG. 13 includes the engageable cap 1302 with the rail extension 1304 coupled to and extending upward from the engageable cap 1304. The engageable cap 1302 may include aspects of engageable cap 36 shown in FIGS. 1, 1A, and 1B. The rail extension 1304 includes the head 1306 and the generally vertical web 1308 extending downward from the head 1306, with an end of the web 1308 distal to the head 1306 coupled to the engageable cap 1302. In some embodiments the rail extension 1304 is integral with the engageable cap 1302.

The rail extension 1304 is configured to support and allow for linear movement along the rail extension 1304 for a building accessory or accessories. In some embodiments the rail is configured for an automated solar panel cleaning apparatus. The solar panel cleaning apparatus would grip onto the rail extension 1302 and work its way around the solar panels by sliding along the rail extension 1302 using either a dry process or a wet process to clean the solar panels. For smaller solar panel arrays a simple, hand-operated mechanical apparatus would be suitable, and for larger commercial arrays, an electrically powered and/or automated cleaning apparatus would be more suitable. Cleaning of solar panels installed on a roof or parking structure is typically difficult to clean with ground-based equipment such as up-and-over manlifts, hand-held pressure washers, long pool brushes, and squeegees. The addition of the rail extension is advantageous in that it allows a secure attachment point and guidance needed for manual/automated, roof-based cleaning equipment for the solar panels. In some embodiments the roofing/solar panel system includes a charging location where the automated solar panel cleaning apparatus would be stored for charging while not in operation. Additionally, the location of the rail extension can assist in hiding the visibility of the attachments for aesthetic purposes.

In other embodiments the rail extension 1304 is configured for operation of other types of modules. In yet another embodiment, the rail extension can be coupled to other linear building elements. For example, a rail extension could be used in conjunction with a curtainwall structure for window cleaning operations (instead of hanging people off of the side of high rise buildings). The rail extension could be added by replacing an engageable cap of existing curtainwall systems. While the rail extension cross-sectional shape is shown in FIG. 13 as similar to a traditional rail shape, it should be understood that the cross-sectional shape may be of any suitable shape for the attached apparatus.

In some embodiments the rail extension 1304 is formed specifically to engage a cleaning apparatus which may be friction or power driven manual or robotic and guided along the rail over the solar panels. Furthermore and importantly the continuous rail provides an anchor point for cleaning apparatuses which currently is not available as a feature of solar panel racking. The rail can be formed in various ways to facilitate cleaning by different devices.

The continuous cap is a unique and distinguishing feature of the system and provides numerous advantages over current systems. The continuous engageable cap as disclosed in various embodiments herein also provides a primary flashing to direct water flows over the solar panels rather than under them. The engageable cap also prevents buildup of dust in the gaps between the panels. The engageable cap also improves the visual appeal of the system by eliminating visual obstructions and presenting a solar array, as one item rather than many disparate items cobbled together.

In other embodiments of the system to support and seal between solar panels a wiring gutter box/channel may be installed between the roofing panel and the underside of the solar panel, with the gutter box/channel running perpendicular to the roofing seams. The gutter box/channel in some embodiments is used for wiring for the solar panel system and can be placed to facilitate placement of vent penetrations where needed. In some embodiments the gutter box/channel includes a snap-on cover and/or has a formed vinyl seal below the gutter box/channel.

In other embodiments of the system to support and seal between solar panels, low-rise plumbing vent terminations are configured to be installed in and operate in conjunction with the system. The low-rise plumbing vent terminations are specially adapted to work with the roof system by being formed low to the roof so not to interfere with the placement of solar modules.

In other embodiments of the system to support and seal between solar panels, low-rise integrated water and HVAC heater vent or supply air weatherheads are configured to be installed in and operate in conjunction with the system.

In other embodiments of the system to support and seal between solar panels, the system is configured to allow for installation of low profile solar panels specifically adapted for engagement to the roofing system and sized, finished and configured to appear similar to the solar panels commercially available for electricity production. In this way both solar water heating and solar photovoltaic electricity production can be accomplished on a single rooftop, with minimal to no negative aesthetic impact.

Figure 14:
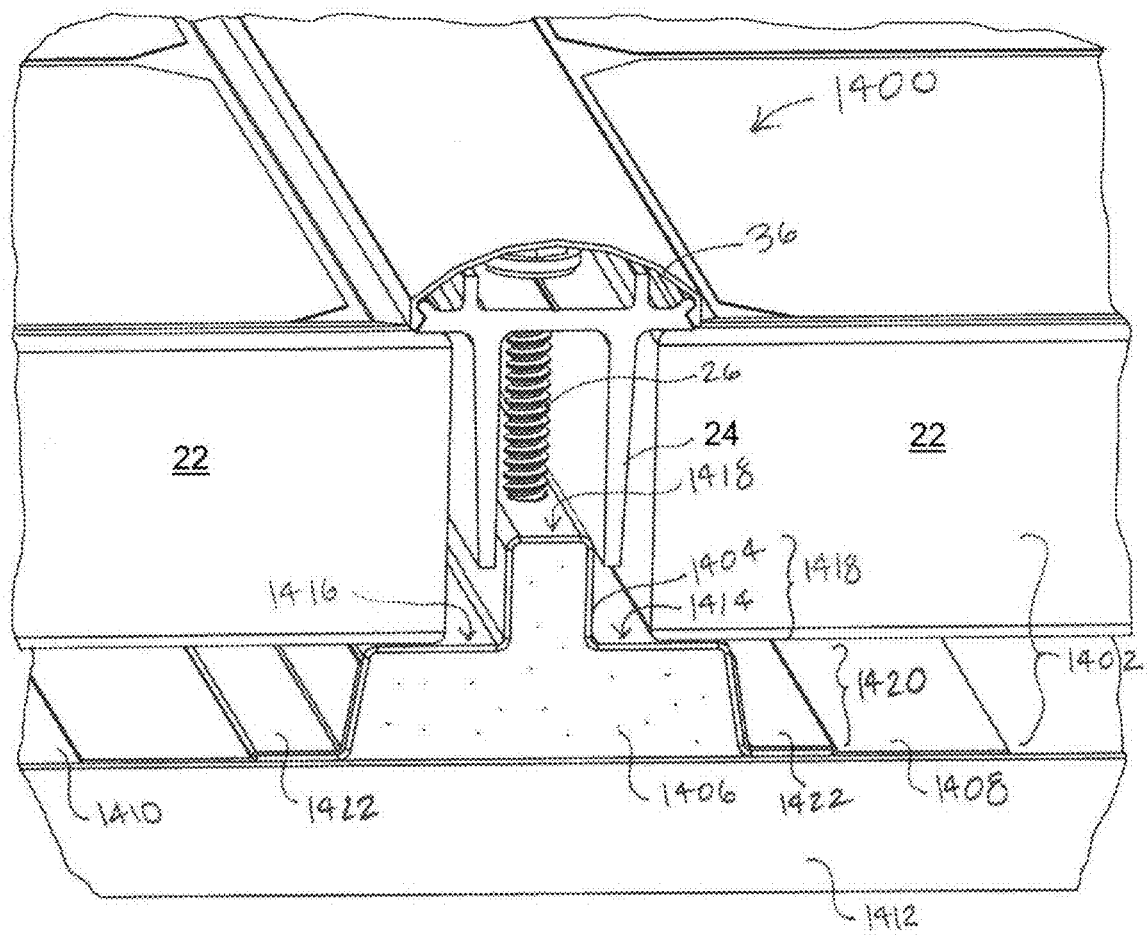
FIG. 14 is a perspective end view of a system to support and seal between solar panels, including a curb assembly, in yet another embodiment of the present invention.
Figure 15:
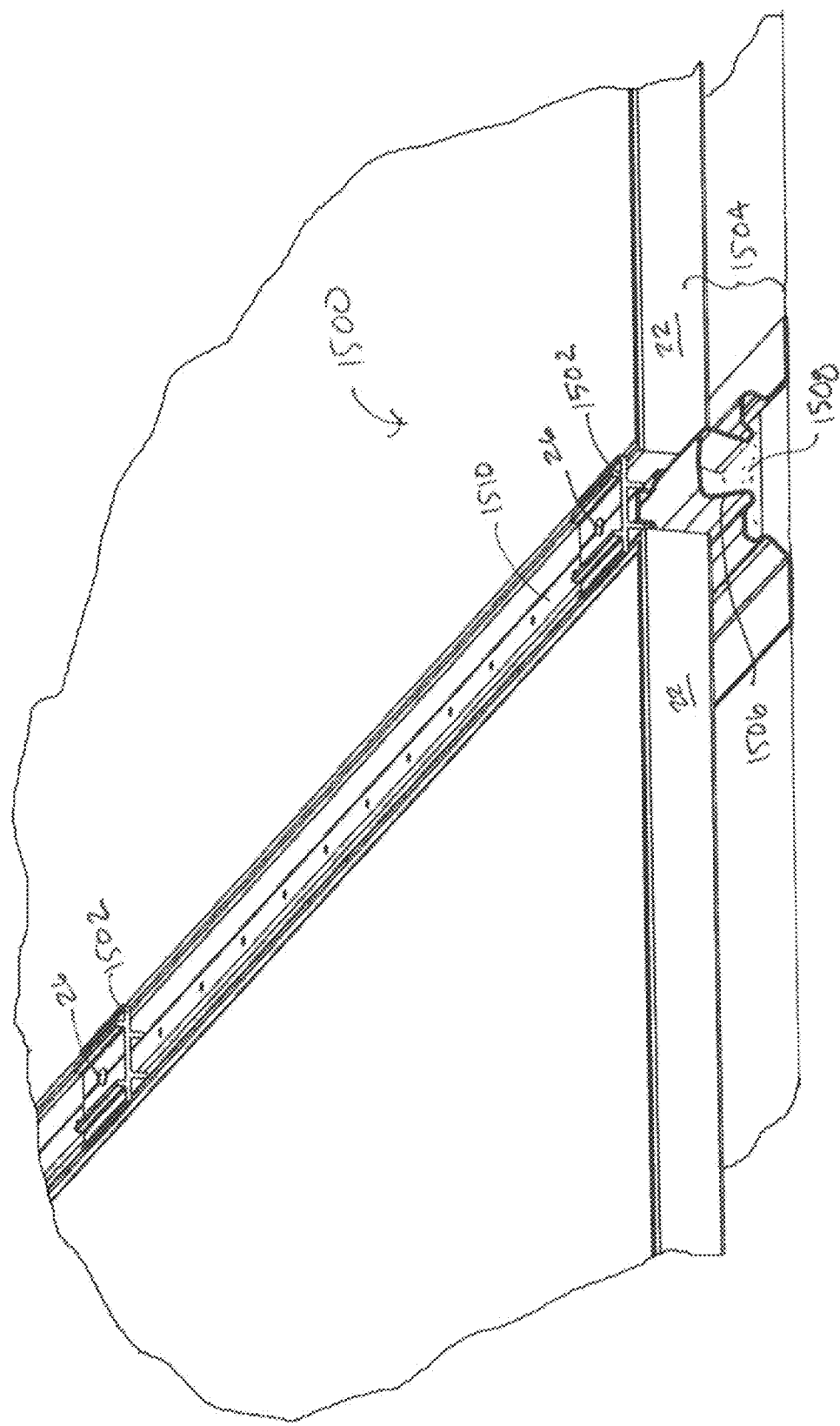
FIG. 15 is a perspective end view of an alternative embodiment of the system of FIG. 14.

Referring next to FIG. 14, a perspective end view of a system 1400 including a support curb is shown in yet another embodiment of the present invention. Shown are the solar panels 22, astragal 24, screw 26, engageable cover 36, a curb assembly 1402, a shaped steel plate 1404, a foam filler 1406, a waterproof membrane skirt 1408, roof membrane 1410, and roof assembly 1412. A perspective cross-sectional view of the curb assembly is shown in FIG. 15

The system 1400 shown in FIG. 14 includes the curb assembly 1402 comprising the shaped steel plate 1404, foam filler 1406, and the waterproof membrane skirt 1408. The roof assembly 1412 is fully constructed and waterproofed with the rolled waterproofed membrane 1412 prior to installation of the curb assembly 1402. The curb assembly 1402 is coupled to the roof and is shaped in a general inverted T-shape, with the flanges of the T-shape forming a lower rectangular portion 1420 with two shelf surfaces 1414 1416 (one on either side of the curb assembly) and a stem of the tee 1418 extending upward vertically between the two shelf surfaces 1414 1416. A solar panel 22 end is supported by each lower shelf surface 1414 1416. The astragal 24 is coupled to the stem 1418 via the fastener 26, which fastens the solar panels 22 to the roof 1412 as previously described. The curb assembly 1402 is in some embodiments continuous under the solar panels 22 in order to provide continuous support to the solar panels 22.

As previously described, the curb assembly 1402 forms the general inverted T-shape including the generally rectangular curb 1420 forming the flange of the inverted T-shape and the centered upward center projection 1418 forming the web. The shaped steel plate 1404 is shaped to provide the exterior shape of the curb assembly 1402. The shaped steel plate 1404 also includes the side extensions 1422 extending generally horizontally outward from the lower edge of the rectangular curb portion 1420. While the curb assembly shown is with reference to the curb assembly 1402 of FIG. 14 It will be understood that the description also applies to the curb assembly 1500 of FIG. 15.

The foam filling 1406 is shaped to match the interior surface of the shaped steel plate 1404 and configured such that when the foam filling 1406 is coupled to the steel plate, the underside surface of the foam filling 1406 generally matches the underside surfaces of the side extensions 1422 (i.e. the underside of the curb assembly 1402 is generally flat). A strip of waterproof membrane, the waterproof membrane skirt 1408, is juxtaposed with the underside surfaces of the foam filling 1406 and the extensions 1422. The waterproof membrane skirt 1408 extends horizontally past the extent of the extensions 1422 such that there is sufficient weld length to the underlying roofing system. In some embodiments the length past the extent of the extensions 1504 is between 2" and 6". The waterproof membrane skirt 1408 in some embodiments is permanently coupled to the steel plate 1404. In some embodiments the coupling is by heat or adhesive coupling. The foam filling 1406 is of sufficient firmness to engage with the other components. In some embodiment the foam filling comprises FPS foam with a 2.5 lb density.

FIG. 15 shows a system 1500, which is an alternative embodiment of the system of FIG. 14. In the embodiment of FIG. 15 a continuous metal clip 1510 snaps over the vertical tee-stem projection of a curb assembly 1504. The curb assembly 1504 comprises a steel plate 1506 and a foam filling 1508. The curb assembly 1504 is shaped and designed to receive the metal clip 1510. The clip 1510 creates a firm ledge for attachment of the solar panel 22, which when tightened to the astragal 24 (which is shortened and spaced along the clip 1510 in this embodiment) further secures the attachment of the solar panel 22 to the underlying curb assembly 1504. In the embodiment of FIG. 15 screws are placed through the foam curb prior to overlaying the roofing membrane material and the continuous clip 1510 is engaged when screwed to the astragal 24 above by the fastener 26 and compressed by the solar modules/panels 24 to attach more tightly to the curb assembly 1504. In some applications using a clip instead of the continuous astragal provides a cost reduction while still providing sufficient mounting structure. Additionally, use of the intermittent clip can make it easier to remove the engageable cover and to replace solar panels if necessary.

The embodiments of attachment of FIGS. 14 and 15 use existing means and methods for sealing roof membranes such that it can be used with all commercially available roofing systems. All roofing systems provide for the installation of curbs and flashing on the roof surface and the curb assemblies 1402 1504 provide for a specially adapted curb and flashing to engage with solar modules/panels 22 in the way substantially described previously.

Referring again to FIGS. 14 and 15, in operation the curb assembly 1402 is placed on top of the waterproof membrane 1410, which has been previously installed, so that the waterproof membrane skirt 1408 is juxtaposed with the waterproof membrane as shown in FIG. 14. The waterproof membrane skirt 1408 is coupled to the waterproof membrane 1410 using a method approved by the manufacturer of the waterproofing materials. As located, the curb assembly 1402 provides the two side shelves 1506. Similarly to the previous embodiments, a solar panel 22 end is supported on each shelf 1506 and the astragal 24 is provided such that it is supported by the top of the solar panels 22. During installation screws 26 are engaged through the central portion 29 of the astragal 24, through the curb assembly 1402, and secured into the roof assembly 1412, whereby the curb is coupled to the roof assembly 1412.

Large commercial roofs use rolled materials as the waterproofing element. The solar panel support system integrates with rolled waterproofing materials using the specially designed curb assembly 1402 that interlocks with the astragal 24 and supports the solar panel modules 22 while providing a surface to adhere and flash the roofing material in a manner that allows for use of existing installation means and methods without significant changes. The curb assembly 1402 comes with the pre-attached waterproofing skirt 1408 which is secured to the underlying surface of the waterproofing membrane 1410 using a method approved by the manufacturer of the waterproofing material. For instance, when using TPO, Thermoplastic Olefin sheet material the installer would simply secure the curb assembly 1410 to the roof assembly 1412 with screws 26 and then run a seamer (an automated heat gun) around the perimeter of the skirting 1408.

Referring again to FIGS. 1, 1A, and 9-17, the mounting systems disclosed include continuous secondary support members to support the underside of the solar panels, which allows in combination with the support along the long sides of the solar panels a structural rigidity to the system such that it may be walked on in much the same way as common roofing materials may be walked on without causing damage to the solar module or to the roof. Current racking and mounting systems for solar modules typical to the industry as shown in FIG. 6 are too flimsy to accommodate being walked on—but are essentially no-go areas on the roof because the array of multiple panels only has rigid support at the points of attachment, which are spaced out along the length of the racking where roof framing members are available for attachment (usually at intervals from 8 to 10 feet).

By integrating solar panel support shelves/ledges into the underlying material and enclosing the perimeter of the module into the roof panel with a secure attachment via the astragal or clips and continuous engageable cap, these systems can be walked on by service and installation personnel with the ordinary care associated with other roofing systems. This walkability factor has significant potential benefits/implications for firefighting as well, since building departments place restrictions on the placement of solar panels because they require fire access to roofs. As a result of this safety requirement large portions of the roof are not available for installation of solar panels. Fire services require a path to ventilate the roof to cut a large hole at various locations. Currently they do not allow solar panels in this path or at potential ventilation areas for safety reasons. There are some electrical hazards which cause this requirement, but with current systems these have been overcome (rapid shutdown is required) and the only remaining hazard is walkability which is overcome with these systems, thus potentially rendering the entire roof available as a solar collection area without restriction for Fire access.

Figure 16:
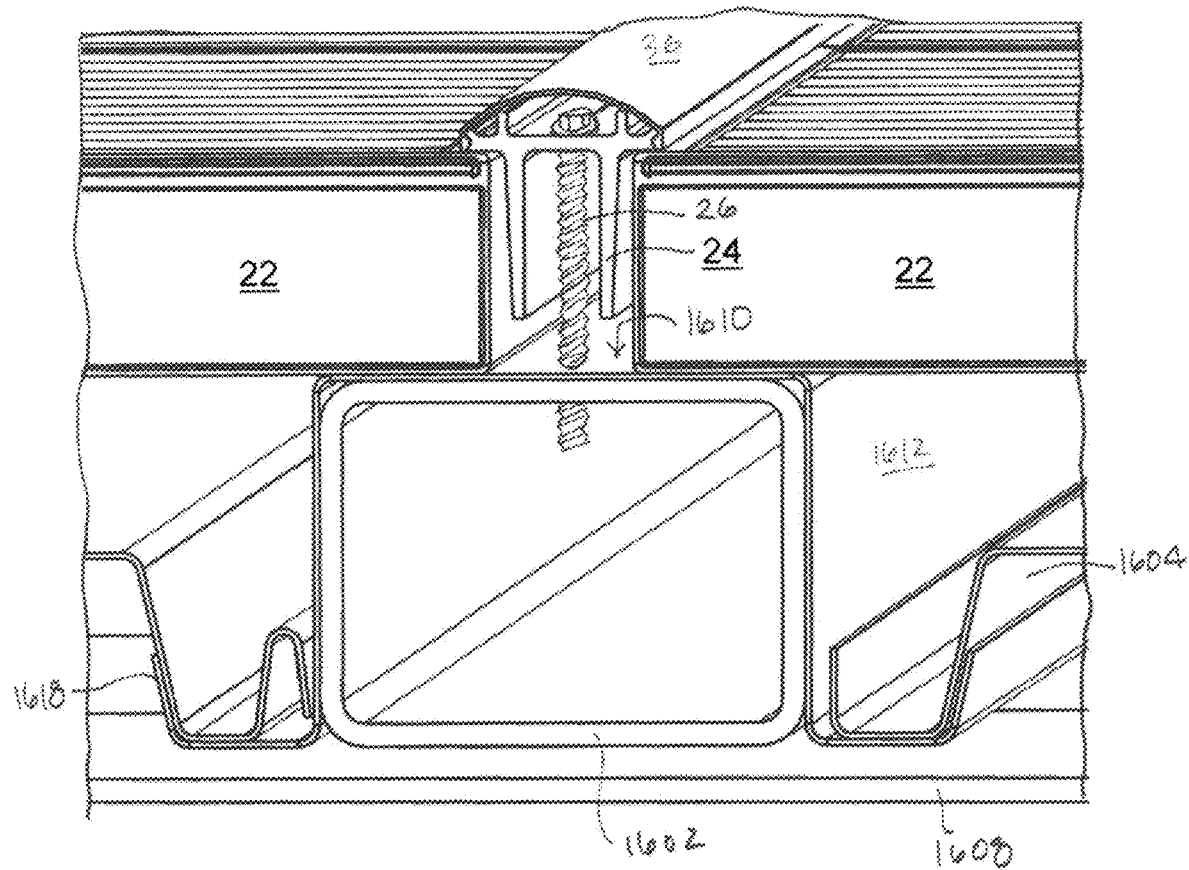
FIG. 16 is a perspective end view of a system to support and seal between solar panels, including a structural beam as a support member, in yet another embodiment of the present invention.

Referring next to FIG. 16, a perspective end view of a system 1600 including a structural beam as a support member is shown in yet another embodiment of the present invention. Shown are the solar panels 22, astragal 24, screw 26, engageable cover 36, a structural beam 1602, structural roof deck 1604, hat flashing 1606, and deck support beam 1608.

In the system 1600 shown in FIG. 16, in lieu of a light-gage support member, a structural beam is used for the solar panel support member. In the embodiment shown in FIG. 16, structural beam 1602 is a rectangular hollow steel section (HSS) having a generally rectangular cross-sectional perimeter shaped, and having a top outer surface 1610, a left outer surface, a right outer surface 1614, and an underside outer surface. It will be apparent to those of ordinary skill in the art that other suitable steel sections, such as wide flange or tee sections, may be used. The hat flashing 1606 is seated on the top outer surface of the beam 1602 and is shaped to generally conform to and juxtapose with the outer surface of the beam 1602, such that the hat flashing 1606 extends across the top surface of the beam and down each of the generally vertical left outer surfaces and right outer surfaces. The hat flashing 1606 also includes a generally horizontal flange 1616 extending outward and away from each of the left outer surface and the right outer surface. A lip 1618 extends generally upward from each flange The deck support beam 1608 is coupled to the underside surface of the structural beam 1602 and a longitudinal axis of the deck support beam 1608 is oriented generally perpendicular to a longitudinal axis of the structural beam 1602. The roof deck 1604 rests on and is supported by the deck support beam 1608 on each side of the structural beam 1602. A portion of the roof deck 1604 proximate to the structural beam 1602 overlaps the proximate lip 1618 and flange 1616 of the hat flashing, thus providing closure for and preventing water intrusion between the roof deck 1604 and the structural beam 1602.

The deck support beam 1608 members shown are channel sections, although any suitable shape may be used. It will be understood that a plurality of parallel deck support members 1608 are typically required to provide the required roof deck support.

Similarly to the embodiments previously shown, the solar panels 22 are seated on the structural beam 1602 (similarly to the support member 18), with a top portion of the hat flashing 1606 interposed between the solar panel 22 and the structural beam 1602. The astragal 24 and engageable cap 36 are installed between the two solar panels 22, with the screw 26 anchoring the astragal 24 to the hat flashing 1606 and the structural beam 1602. In this way the solar panels are compressibly coupled to the structural beam, as previously described.

In the embodiment shown in FIG. 16, the use of the structural beam 1602 instead of an additional support member allows the system 1600 to be thinner, as instead of a separate support member for the solar panels and a structural beam, the two have been combined into the single structural beam 1602 that performs both the function of a structural support of the roof system and a curb and support for the solar panels 22.

Figure 17:
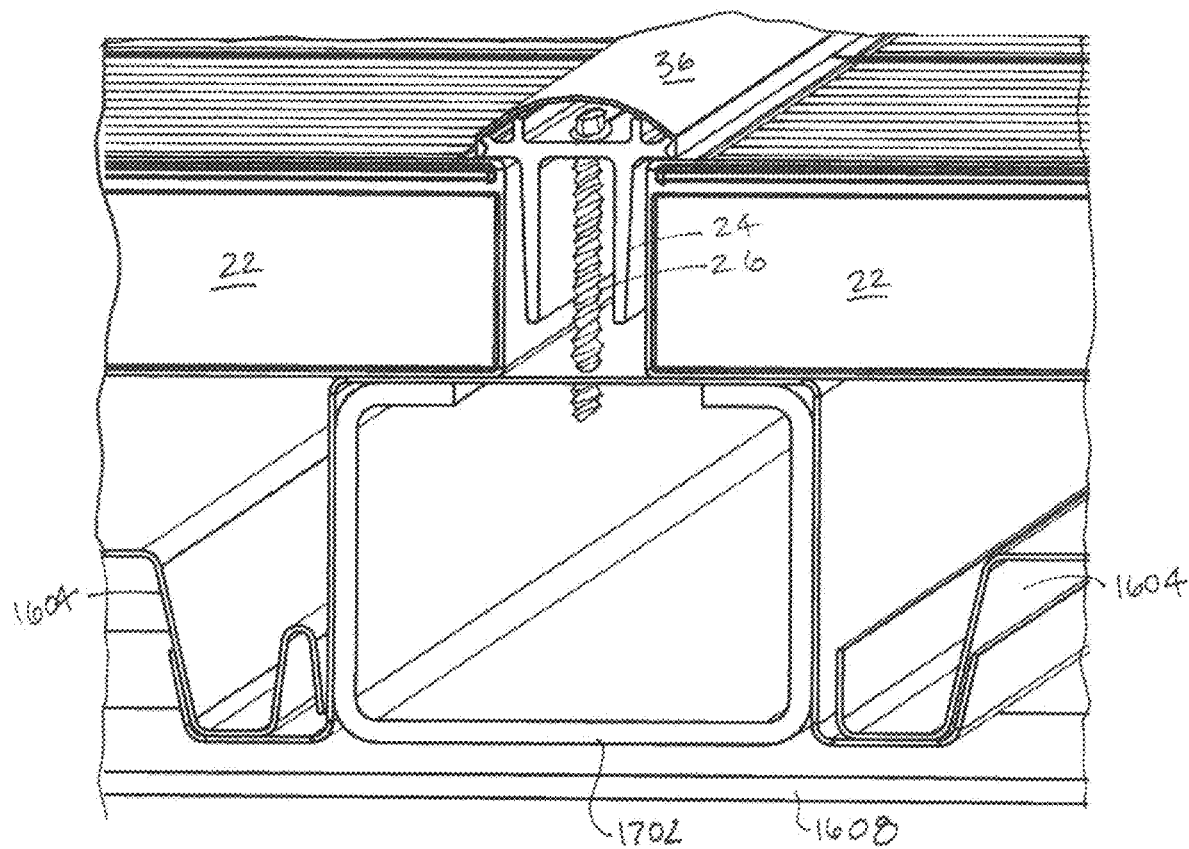
FIG. 17 is a perspective end view of a system to support and seal between solar panels, including a beam as a support member, in yet another embodiment of the present invention.

Referring next to FIG. 17, a perspective end view of a system 1700 including a beam as a support member is shown in yet another embodiment of the present invention. An open HSS beam 1702 is shown. Internal stiffeners (not shown) may be provided to the HSS beam 1702 as required.

Figure 18:
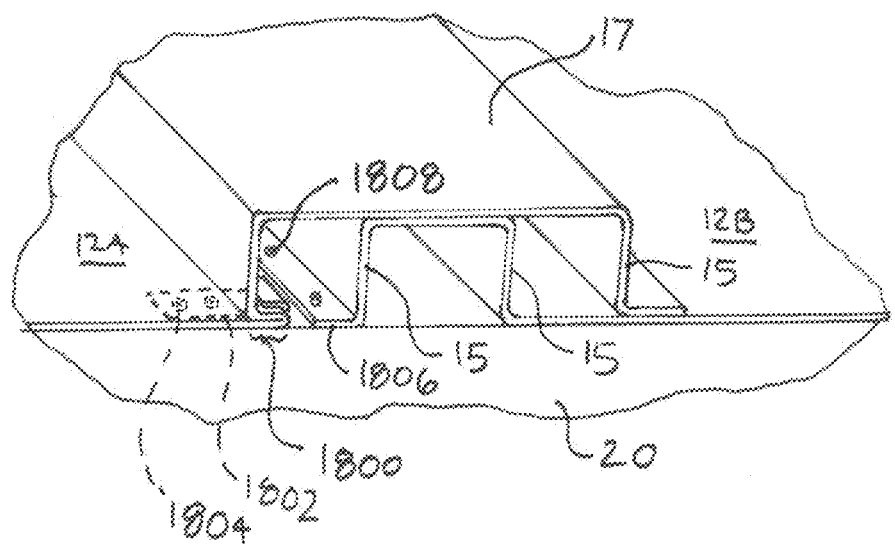
FIG. 18 is a perspective view of a roof panel overlap at a secondary support member in yet another embodiment of the present invention.

Referring next to FIG. 18, a perspective view of a roof panel overlap at the secondary support member 17 is shown in yet another embodiment of the present invention. Shown are the first roof portion 12A, second roof portion 12B, folded edges 15, secondary support 17, underlying support surface 20, hem 1800, clip 1802, hem fasteners 1804, fastener lip 1806, and lip fasteners 1808.

Shown in FIG. 18 is an alternative embodiment of the roof panel overlap shown in FIGS. 9 and 11. In the embodiment shown in FIG. 18, first roof portion 12A includes the horizontal folded hem 1800 which is juxtaposed with the underlying roofing surface 20. Prior to installation of the roof panels 12A and 12B, a plurality of clips 1802 are coupled to the roof surface 20 using the plurality of fasteners 1804 in locations to receive and couple the hem 1800 to the clips 1802 and thus to the roof surface 20.

In the embodiment shown in FIG. 18, the fastener lip 1806 of the second roof panel 12B is folded outward, i.e. extends outward in the direction toward the first roof panels 12A (instead of extending inward back toward roof panel 12B, as shown in FIGS. 9 and 11). During installation, second roof panel 12B is coupled to the underlying roof surface 20 by installing the lip fasteners 1808 through the exposed fastener lip 1806. Prior to installation of the first roof portion 12A, the plurality of clips 1802 are coupled to the roof surface 20 using the clip fasteners 1804 in locations to receive the hem 1800 of the first roof portion 12A. Then the first roof portion 12A is installed with the folded edges 15 of the first roof portion 12A over the folded edges 15 of the second roof portion 12B by coupling the hem 1800 to the plurality of clips 1802. This same system can be used with expansion roof panels that allows for installation of solar modules/panels in a landscape orientation.

The roof panel overlap embodiment of FIG. 18 retains the advantageous features of the embodiment shown in FIGS. 9 and 11, such as being adjustable to receive solar panels of varying widths while still forming an appropriately flashed roof system forming a rain-tight seal. The embodiment of FIG. 18 allows the clip fasteners 1804 to be fully concealed, unlike the roof overlap of FIGS. 9 and 18, which requires exposed fasteners. Additionally, the use of clips is superior to using other direct fasteners such as face screws, as face screws create stress points at the fastener locations due to thermal movement of the metal roofing material. Use of clips allows for thermal movement of the roofing panels, reducing stress on the roofing material and reducing potential for compromising of the waterproofing of the roof. Additionally, the overlapping part of the profile allows for the system of attachment to be adapted to solar modules in various standard/typical sizes.

Figure 19:
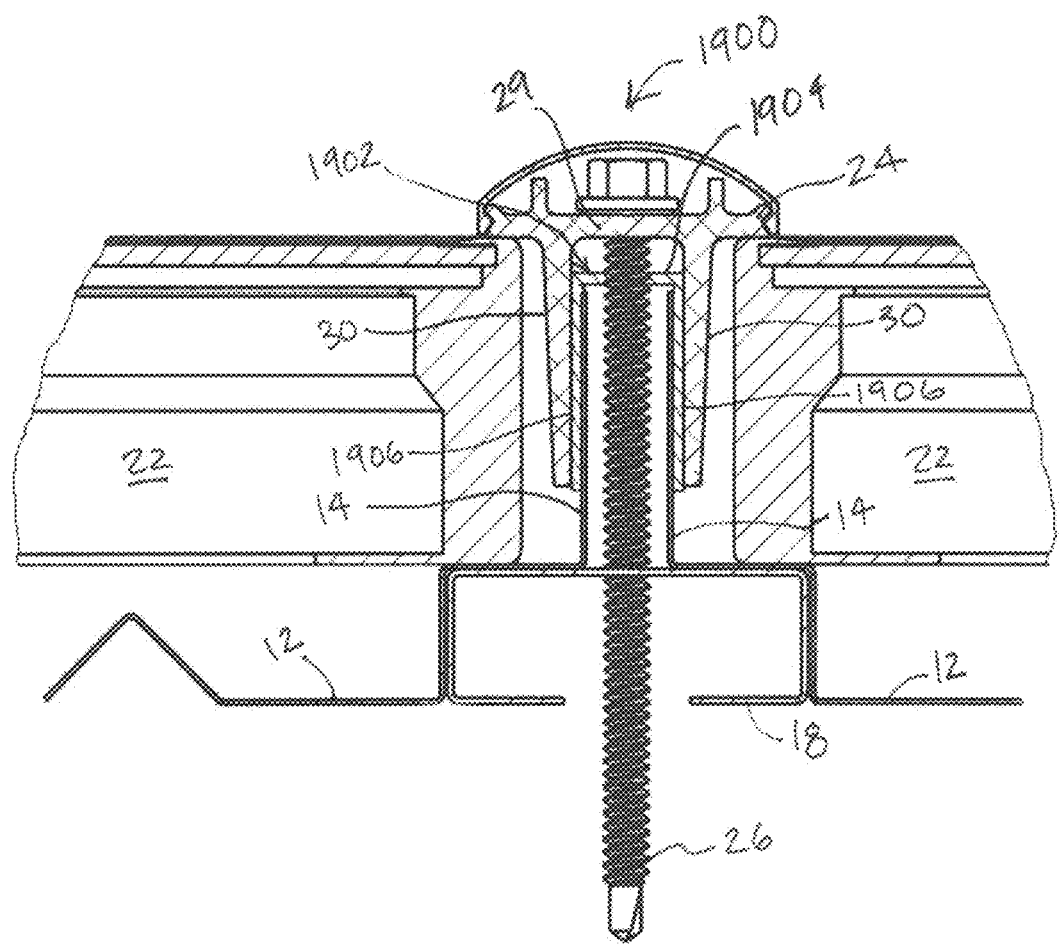
FIG. 19 is a sectional view of a system to support and seal between frameless solar panels is in yet another embodiment of the present invention.

Referring next to FIG. 19, a sectional view of a system 1900 to support and seal between frameless solar panels is shown in another embodiment of the present invention. Shown are screw 26, support member 18, projecting portions 14, roof panels 12, solar panels 22, astragal 24, astragal center portion 29, parallel ribs 30, engageable cap 36, seal 1902, seal center portion 1904, and seal legs 1906.

The system 1900 includes the seal 1902. The seal 1902 is in an inverted U-shape, comprising the horizontal center portion interposed between two legs 1906 generally normal to the center portion 1904 and extending downward from the center portion 1904. The seal 1902 dimensions are such that each leg 1906 of the seal is interposed between the generally vertical projection 14 and the proximate generally vertical astragal parallel rib 30. As shown in FIG. 19, when installed in the system 1900, the center portion 1904 is located beneath the astragal center portion 29. The seal 1902 comprises a waterproof material. In some embodiments the seal 1902 is a waterproof vinyl seal.

For additional weatherproofing and protection, and/or when there is a scheduling gap between dry-in status of the roof and installation of the solar modules, the seal 1902 can be installed under the center portion 29 of the astragal 24. The seal 1902 provides an extra layer of water intrusion protection at the gap between the astragal leg 30 and the projection 14, and/or when the solar panels 22 have not yet been installed. If dissimilar metal contact is deemed to be a problem, then the seal 1902 also provides electrical isolation between the coated roofing material and the aluminum astragal 24. Thus the seal 1902 advantageously provides both electrical isolation and additional weather sealing properties.

While all of the fundamental characteristics and features of the combined metal roof panel and solar panel mounting components of the device herein enabling the method herein have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

While the invention herein disclosed has been described by means of specific embodiments, examples and applications thereof numerous modifications and variations could be made thereto by those skilled in the art without departing from the scope of the invention set forth in the claims.

What is claimed is:

1. A solar panel mounting system, comprising:
   a curb assembly coupled to and extending upward from a top surface of a roof, wherein the curb assembly has a longitudinal length and a transverse inverted t-shape having a left side and a right side and comprising a lower horizontal flange portion and an upper stem portion extending upward centrally from the lower horizontal flange portion whereby a generally horizontal shelf surface is formed on each side of the curb assembly;
   an astragal comprising a horizontal portion and a rib projecting downward from the horizontal portion and having a lower end, the astragal located relative to the upper stem portion such that when an end of a solar panel is supported on one of the generally horizontal shelf surfaces a horizontal extension of the horizontal portion extends over a top surface of the end of the solar panel and the rib is interposed between the end of the solar panel and the upper stem portion; and
   a vertical fastener engaged through a portion of the astragal located over the upper stem portion and into a portion of the upper stem portion below such that the astragal horizontal extension contacts and compressively engages the top surface of the end of the solar panel, whereby the solar panel is mounted to the roof.

2. The solar panel mounting system of claim 1, wherein the curb assembly comprises a plate having an outer surface forming the generally horizontal shelf surfaces and the upper stem portion, whereby an interior space is formed between the plate and the roof top surface.

3. The solar panel mounting system of claim 2, the curb assembly further comprising a foam filling that fills at least a portion of the interior space.

4. The solar panel mounting system of claim 2, the curb assembly comprising a waterproof membrane skirt coupled to the curb assembly plate and interposed between the curb assembly plate and the roof top surface.

5. The solar panel mounting system of claim 4, wherein the waterproof membrane skirt extends past an edge of the plate on opposite sides.

6. The solar panel mounting system of claim 2, wherein the plate is a steel plate.

7. The solar panel mounting system of claim 2, the plate further including a side extension located at each side of the curb assembly, each side extension of the plate extending generally horizontally outward from an edge of the plate located at that side of the curb assembly.

8. A method for mounting a solar panel to a roof, comprising the steps of:
   coupling a curb assembly to a top surface of the roof, wherein the curb assembly has a longitudinal length and a transverse inverted t-shape having a left side and a right side and comprising a lower horizontal flange portion and an upper stem portion extending upward centrally from the lower horizontal flange portion, whereby a generally horizontal shelf surface is formed on each side of the curb assembly;

supporting an end of a solar panel on one of the generally horizontal shelf surfaces;

locating an astragal, comprising a horizontal portion and a rib projecting downward from the horizontal portion and having a lower end, relative to the upper stem portion of the curb assembly such that a horizontal extension of the astragal extends over a top surface of the end of the solar panel and the rib is interposed between the end of the solar panel and the upper stem portion; and engaging a vertical fastener through a portion of the astragal located over the upper stem portion and into the upper stem portion below such that the astragal horizontal extension contacts and compressively engages the top surface of the end of the solar panel, whereby the solar panel is mounted to the roof.

9. The method for mounting the solar panel to the roof of claim 8, wherein the curb assembly comprises a plate having an outer surface forming the generally horizontal shelf surfaces and the upper stem portion, whereby an interior space is formed between the plate and the roof top surface.

10. The method for mounting the solar panel to the roof of claim 9, the curb assembly further comprising a foam filling that fills at least a portion of the interior space.

11. The method for mounting the solar panel to the roof of claim 9, the curb assembly comprising a waterproof membrane skirt coupled to the curb assembly plate and interposed between the curb assembly plate and the roof top surface.

12. The method for mounting the solar panel to the roof of claim 11, wherein the waterproof membrane skirt extends past an edge of the plate on each side.

13. The method for mounting the solar panel to the roof of claim 9, wherein the plate is a steel plate.

14. The method for mounting the solar panel to the roof of claim 9, the plate further including a side extension located at each side of the curb assembly, each side extension of the plate extending generally horizontally outward from an edge of the plate located at that side of the curb assembly.

* * * * *